(12) United States Patent
Kanaoka

(10) Patent No.: US 7,554,897 B2
(45) Date of Patent: Jun. 30, 2009

(54) DATA REPRODUCER

(75) Inventor: Toshikazu Kanaoka, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 629 days.

(21) Appl. No.: 11/280,558

(22) Filed: Nov. 16, 2005

(65) Prior Publication Data
US 2006/0077830 A1    Apr. 13, 2006

Related U.S. Application Data

(63) Continuation of application No. PCT/JP03/11068, filed on Aug. 29, 2003.

(51) Int. Cl.
*G11B 7/00* (2006.01)

(52) U.S. Cl. ............................ 369/124.02; 369/124.15; 369/47.53; 369/44.32

(58) Field of Classification Search ............ 369/124.02, 369/124.12, 124.15, 47.5, 47.53, 44.26, 44.32, 369/44.29, 44.35, 59.17
See application file for complete search history.

(56) References Cited

U.S. PATENT DOCUMENTS

| | | | | |
|---|---|---|---|---|
| 5,319,625 A | * | 6/1994 | Okuda | 369/53.44 |
| 5,321,519 A | * | 6/1994 | Akiyama | 369/53.33 |
| 5,361,136 A | * | 11/1994 | Okuda | 386/115 |
| 5,402,403 A | * | 3/1995 | Maeda | 369/44.32 |
| 5,568,456 A | * | 10/1996 | Hayashi et al. | 369/124.01 |
| 5,790,492 A | * | 8/1998 | Umezawa et al. | 369/53.33 |
| 5,889,752 A | * | 3/1999 | Maeda et al. | 369/53.33 |
| 5,898,654 A | | 4/1999 | Shimada et al. | |
| 5,909,413 A | * | 6/1999 | Araki | 369/44.32 |
| 6,134,211 A | | 10/2000 | Miyanabe et al. | |
| 6,163,518 A | * | 12/2000 | Miyanabe et al. | 369/124.02 |
| 6,172,950 B1 | | 1/2001 | Tanaka | |
| 6,970,406 B2 | * | 11/2005 | Kuribayashi et al. | 369/47.19 |
| 6,982,937 B2 | * | 1/2006 | Kanaoka et al. | 369/47.17 |

(Continued)

FOREIGN PATENT DOCUMENTS

EP    1244105    9/2002

(Continued)

OTHER PUBLICATIONS

Zi-Ning Wu et al., "A MMSE Interpolated Timing Recovery Scheme for The Magnetic Recording Channel", 1997 IEEE International Conference on Communications, Montreal, Jun. 8, 1997, pp. 1625-1629.

*Primary Examiner*—Thang V Tran
(74) *Attorney, Agent, or Firm*—Greer, Burns & Crain, Ltd.

(57) ABSTRACT

It is an object of the present invention to provide a data reproducer in which the quality of a reproduction signal is improved. A data reproducer of the present invention includes a phase-difference detecting section which obtains the cross correlation value between the head pattern in a track to be reproduced and a reproduction signal, synchronous detectors which respectively obtain the cross correlation value between the head pattern of a track adjacent to the track to be reproduced and the reproduction signal, and crosstalk value detector which obtains the direction and ratio of crosstalk in accordance with these cross correlation values. The data reproducer has a correcting function which corrects the offset and gain of a reproduction signal in accordance with a phase difference and cross correlation value obtained by the phase-difference detecting section.

26 Claims, 36 Drawing Sheets

U.S. PATENT DOCUMENTS

| | | |
|---|---|---|
| 2003/0011920 A1 | 1/2003 | Tsuchinaga |
| 2003/0012123 A1 | 1/2003 | Miyamoto et al. |
| 2003/0031103 A1* | 2/2003 | Kuribayashi et al. ..... 369/47.17 |
| 2003/0117914 A1 | 6/2003 | Kanaoka et al. |

FOREIGN PATENT DOCUMENTS

| | | |
|---|---|---|
| JP | 6-243596 | 9/1994 |
| JP | 8-045080 | 2/1996 |
| JP | 8-055341 | 2/1996 |
| JP | 8-077627 | 3/1996 |
| JP | 11-066659 | 3/1999 |
| JP | 2003-196840 | 7/2003 |

* cited by examiner

FIG. 3

Recording data        10101010 11110000 11110000 10101010
                              ↓  1+D characteristic
Reproducing sample data   11111111 12221000 12221000 11111111

DATA REPRODUCER

This is a continuation of International Application No. PCT/JP03/11068, filed Aug. 29, 2003.

TECHNICAL FIELD

The present invention relates to a data reproducer which reproduces the data recorded in a recording medium.

BACKGROUND ART

Larger capacity and higher-speed transfer are eagerly requested in future for data reproducers such as an optical (magnetic) disk drive and a hard disk drive (HDD) represented by a DVD (Digital Versatile Disk) and MO (Magneto-Optical disk) continuously becoming higher density in recent years in the deversified information society. However, in the case of a recording medium for these data reproducers, a track interval becomes very narrow. Therefore, the quality of a reproduction signal is easily influenced by crosstalk and higher density is difficult.

To realize higher density by improving the quality of the reproduction signal, it is considered to detect and cancel crosstalk.

FIGS. 1 and 2 are illustrations showing examples of formats to be applied to a recording medium in order to detect crosstalk. FIG. 1 shows an example of a format which does not distinguish between crosstalks from both tracks adjacent to each other and FIG. 2 shows an example of a format which differentiates crosstalk from which of both tracks adjacent to each other.

In either of examples of formats in FIGS. 1 and 2, crosstalk detection areas 3 in which 1T continuous block and 4T continuous block are arranged on tracks 1_1, . . . , and 1_5 and block arrangement patterns between the 1T continuous block and the 4T continuous block are different between adjacent tracks in the crosstalk detection areas 3. Thus, when a beam spot 2 becomes off track in the crosstalk detection areas 3 in which the 1T continuous block and 4T continuous block are arranged, it is possible to detect the crosstalk generated in a reproduction signal.

In this case, sample data values (reproduction signals) reproduced from the 1T continuous block and 4T continuous block are described.

FIG. 3 is an illustration showing sample data values reproduced from the 1T continuous block and 4T continuous block.

The pattern "10101010" shown in FIG. 3 shows the data recorded in the 1T continuous block and the pattern "11110000" shows the data recorded in the 4T continuous block. These recorded data values are reproduced by a reproducing channel having the 1+D characteristic and become sample data values (reproduction signals) of "11111111" and "12221000". Therefore, the reproduction signal from the 1T continuous block is a signal having an amplitude of 0 and a reproduction signal from the 4T continuous block has a large amplitude.

The examples of formats shown in FIGS. 1 and 2 respectively calculate a crosstalk value by measuring how many amplitude signals due to the 4T continuous block of adjacent tracks cause crosstalk in the 1T continuous block in which amplitude does not occur by using characteristics of the reproduction signals.

FIG. 4 is a conceptual view of crosstalk detection.

In the case of the reproduction signal 4_1 when there is no crosstalk, amplitude becomes 0 in the 1T continuous block. However, in the case of the reproduction signal 4_2 when there is crosstalk, an amplitude signal 5 is detected in the 1T continuous block and the amplitude signal 5 is crosstalk due to the 4T continuous block of adjacent tracks. Moreover, by comparing the amplitude of the 4T continuous block at the previous stage with a 4T continuous amplitude causing crosstalk, it is possible to measure the degree of crosstalk.

A technique which detects crosstalk in a test area on a recording medium in accordance with the principle of the crosstalk detection concept and applies offset to a beam spot position to a track (for example, refer to Patent Document 1) and a technique which forms a crosstalk detection area by using a prepit (for example, refer to Patent Document 2) are known.

(Patent Document 1) Japanese Patent Laid-Open No. 8-77627

(Patent Document 2) Japanese Patent Laid-Open No. 8-45080

However, it is difficult to obtain an accuracy which sufficiently improves a quality of a reproduction signal by the crosstalk detection according to the principle. Moreover, the capacity of a recording medium is lost by a value equivalent to a crosstalk detection area.

The quality of a reproduction signal is influenced also when the offset of a signal intensity or a gain defect of a signal occurs in a processing circuit which processes a reproduction signal other than the case of the crosstalk.

DISCLOSURE OF THE INVENTION

It is an object of the present invention to provide a data reproducer which improves the quality of a reproduction signal in view of the above situation. Particularly, it is a first object of the present invention to improve a quality by high-accuracy detection of crosstalk and a second object of the present invention to improve a quality by correction of an offset or gain of a reproduction signal.

A first data reproducer of the present invention which achieves the above objects is a data reproducer which reproduces data from a recording medium which has a plurality of parallel linear tracks and in which data is recorded along the tracks, wherein:

the recording medium has a first area along the tracks in which user data is recorded and a second area which precedes the first area along the tracks and in which pattern data used for correction of reproducing timing of the user data is recorded, and the pattern data adjacent to each other being mutually different between tracks adjacent to each other, and the data reproducer comprises:

a head which faces the recording medium, reproduces the data recorded in the recording medium, and obtains a reproduction signal;

a first pattern comparing section which compares a reproduction signal obtained when the second area along a track to be reproduced by the head with the pattern data which must be reproduced from the second area;

a timing correcting section which corrects reproducing timing in accordance with a comparison result by the first pattern comparing section;

a second pattern comparing section which compares a reproduction signal obtained when the second area along the track to be reproduced by the head with the pattern data which must be reproduced from the second area along a track adjacent to the track to be reproduced; and a crosstalk detecting section which detects crosstalk in accordance with comparison results by the first pattern comparing section and the second pattern comparing section.

According to the first data reproducer of the present invention, it is possible to accurately detect the crosstalk due to the pattern data on adjacent tracks in accordance with the comparison results by the first pattern comparing section and second data comparing section, reduce crosstalk, and improve a signal quality.

Moreover, because the pattern data also serves as the pattern data which has been prepared so far on the recording medium in order to reproduce user data, it is possible to avoid the capacity loss of the recording medium.

In the case of the first data reproducer of the present invention, it is preferable that the pattern data is pattern data whose auto correlation value shows a peak only at a coincidence point and in which a cross correlation value with other pattern is smaller than the auto correlation value. In this case, it is particularly preferable that the above pattern data is a maximum length shift-register-sequence (M sequence).

When pattern data is data showing the above auto-correlation value or cross-correlation value as represented by longest code sequence (M sequence), the detection accuracy of crosstalk is further improved.

It is preferable that in the first data reproducer of the present invention includes a tracking adjusting section which adjusts the reproducing position of the head to the track to be reproduced in accordance with the crosstalk detected by the crosstalk detecting section.

Because normal crosstalk is generated when the reproducing position of a head is shifted from a target track, crosstalk decreases by correcting the reproducing position to the track.

It is allowed that the first data reproducer having the tracking adjusting section has a conformation that "the above recording medium has a test area used for a test of recording/reproducing of data, and the tracking adjusting section performs the adjustment in accordance with the crosstalk detected at the time of a test in the test area", a conformation that "the tracking adjusting section performs the above adjustment when failing in recording/reproducing of data and retrying recording/reproducing", or a conformation that "the above tracking adjusting section sequentially performs the adjustment in accordance with the crosstalk detected when data is reproduced".

When performing adjustment in accordance with the crosstalk in a test area, adjustment is performed by estimating an adjustment value suitable for data reproduction in another area from the crosstalk in the test area. Therefore, it is possible to reduce the addition to a reproducer by also detecting crosstalk when reproducing data in the another area.

Moreover, when performing adjustment when retrying recording and reproducing, it is possible to reduce the addition to the reproducer by leaving the crosstalk which realizes recording and reproducing as it is.

Furthermore, when successively performing adjustment in accordance with the crosstalk detected at the time of reproducing, it is possible to prevent the crosstalk working against recording and reproducing from occurring though the addition to the reproducer is large.

Furthermore, it is also preferable that the first data reproducer of the present invention has an angle adjusting section which adjusts an angle for the head to face the recording medium in accordance with the crosstalk detected by the crosstalk detecting section.

Also when the head tilts from the recording medium without staying at a correct position, this becomes a cause of crosstalk. In this case, it may be difficult to reduce crosstalk even if correcting the reproducing position of the head. Therefore, it is possible to reduce crosstalk by using the angle adjusting section.

It is allowed that the first data reproducer including the above angle adjusting section has a conformation that "the above recording medium has a test area used for a test recording/reproducing of data, and the above angle adjusting section performs adjustment in accordance with the crosstalk detected at the time of a test in the test area", a conformation that "the above angle adjusting section performs the above adjustment when failing in recording/reproducing of data and retrying recording/reproducing", or a conformation that "the above angle adjusting section sequentially performs the above adjustment in accordance with the crosstalk detected when reproducing data".

Advantages of the conformations shown above are the same as the advantages of conformations when using the tracking adjusting section.

Moreover, it is preferable that the first data reproducer includes a reproducing-power adjusting section which adjusts the reproducing-power of the head in accordance with the crosstalk detected by the crosstalk detecting section.

When the reproducing-power is improper and particularly too strong, a beam spot on a medium becomes too large and crosstalk occurs. Therefore, by using the reproducing-power adjusting section, it is possible to reduce crosstalk by adjusting the spot size to a proper size.

It is allowed that the first data reproducer having the above reproducing-power adjusting section has a conformation that "the above recording medium has a test area used for a test of recording/reproducing of data and the reproducing-power adjusting section performs the above adjustment in accordance with the crosstalk detected at the time of a test in a test area", a conformation that "the above reproducing-power adjusting section performs the above adjustment when failing in recording/reproducing of data and retrying recording/reproducing", or a conformation that "the above reproducing-power adjusting section successively performs the above adjustment in accordance with the crosstalk detected when reproducing data.

Advantages of the conformations shown above are the same as advantages of the conformations when using the tracking adjusting section.

Moreover, it is preferable that the first data reproducer of the present invention has a distance adjusting section which adjusts a distance for the head to face the recording medium in accordance with the crosstalk detected by the crosstalk detecting section.

When the distance for the head to face the recording medium is improper, a beam spot on the medium is out of focus and a crosstalk rate increases. Therefore, by using the above distance adjusting section, it is possible to repair a state out of focus and decrease crosstalk.

It is allowed that the first data reproducer having the above distance adjusting section has a conformation that "the above recording medium has a test area used for a test of recording/reproducing of data and the above distance adjusting section performs the above adjustment in accordance with the crosstalk detected at the time of a test in a test area", a conformation that "the distance adjusting section performs the above adjustment when failing in recording/reproducing of data and retrying recording/reproducing", or a conformation that "the distance adjusting section sequentially performs the above adjustment in accordance with the crosstalk detected when reproducing data".

Advantages of the conformations shown above are the same as advantages of the conformations when using the tracking adjusting section.

Moreover, it is preferable that the first data reproducer of the present invention has a conformation that "the above head records data in a recording medium, and the data reproducer includes a recording-power adjusting section which adjusts recording power of the head in accordance with the crosstalk detected by the crosstalk detecting section".

When crosstalk occurs, cross write may occur which overwrites the data in an adjacent track when recording data. Therefore, by using the above recording-power adjusting section, it is possible to prevent cross write by adjusting recording power to proper power.

It is preferable that the first data reproducer having the recording-power adjusting section has a conformation that "the above recording medium has a test area used for a test of recording/reproducing of data and the above recording-power adjusting section performs the above adjustment in accordance with the crosstalk detected at the time of a test in a test area". By previously properly adjusting recording power in accordance with the crosstalk in the test area, it is possible to prevent crosswrite from occurring when permanently recording user data.

It is preferable that the first data reproducer of the present invention obtains a cross correlation value as a result when the first pattern comparing section and the second pattern comparing section compare pattern data with a reproduction signal.

It is possible to accurately determine matching or mismatching of a pattern by obtaining the cross correlation value and as a result, it is possible to accurately determine presence or absence of crosstalk.

Moreover, it is preferable that the fist data reproducer of the present invention converts the pattern data when the first pattern comparing section and the second pattern comparing section compare pattern data with a reproduction signal so that the sum total of data levels becomes 0 and compares the converted pattern data with the reproduction signal to obtain a cross correlation value.

When the pattern data is converted so that the sum total of levels of the pattern data becomes 0 and is used for comparison, a correlation value when comparison with a signal having no correlation becomes 0 and present or absence of correlation becomes clear.

Moreover, in the case of the first data reproducer of the present invention, it is preferable that the crosstalk detecting section detects crosstalk in accordance with a relative ratio between maximum values of cross correlation values obtained by the first pattern comparing section and the second pattern comparing section. It is possible to accurately detect presence or absence and a rate of crosstalk in accordance with the above relative ratio.

Furthermore, it is preferable that the above crosstalk detecting section of the first data reproducer of the present invention determines that crosstalk is present when the cross correlation value obtained by the second pattern comparing section exceeds a predetermined threshold value.

When the predetermined threshold value is used as a determination reference, accurate determination not influenced by a threshold value generated by a cause other than crosstalk is realized. In this case, it is also allowed that the crosstalk detecting section determines presence or absence of crosstalk by the set predetermined threshold value.

A second data reproducer of the present invention which achieves the above object is a data reproducer which reproduces data from a recording medium which has a plurality of parallel linear tracks and in which the data is recorded along the tracks, wherein:

the recording medium has a first area along the tracks in which user data is recorded and a second area which precedes the first area along the tracks, and the second area being used for correction of the reproducing timing of the user data and having recorded therein pattern data whose auto correlation value shows a peak only at a coincidence point, and the data reproducer comprises:

a head which faces the recording medium and reproduces the data recorded in the recording medium to obtain a reproduction signal;

a pattern comparing section which compares a reproduction signal reproduced in the second area along a track to be reproduced and obtained by the head with pattern data which must be reproduced from the second area;

a timing correcting section which corrects reproducing timing in accordance with a comparison result by the pattern comparing section; and a DC offset correcting section which detects the DC component of a reproduction signal obtained by the head in accordance with a comparison result by the pattern comparing section and corrects the DC component of the reproduction signal by an offset correction value corresponding to the DC component.

According to the second data reproducer of the present invention, it is possible to accurately obtain and correct a value (offset value) in which the DC component of the reproduction signal is deviated from the original level suitable for signal processing by using a comparison result by the pattern comparing section and improve a signal quality.

It is allowed that the second data reproducer of the present invention has a conformation that "the above DC offset correcting section corrects the DC component of the reproduction signal by feeding back an offset correction value to an output of the head" or a conformation that "the DC offset correcting section corrects the DC component of the reproduction signal whose reproducing timing is corrected by the timing correcting section by an offset correction value".

When correcting an offset correction value for the reproduction signal whose reproducing timing is corrected, digital correction of feed forward can be made and it is suitable for improvement of signal processing speed.

Moreover, it is allowed that the second data reproducer of the present invention has a conformation that "the DC offset correcting section obtains the DC component of a reproduction signal by obtaining the timing at which pattern data becomes 0 level from a comparison result by the pattern comparing section and calculating the sum total of reproduction signal values at the timing" or a conformation that "the above DC offset correcting section obtains the DC component of a reproduction signal by obtaining the timing at which pattern data becomes a maximum level and the timing at which the pattern data becomes a minimum level from a comparison result by the pattern comparing section and calculating the intermediate value between the average of reproduction signal values at the timing at which the pattern data becomes the maximum level and the average of reproduction signal values at the timing at which the pattern data becomes the minimum level".

Moreover, in the case of the second data reproducer of the present invention, it is preferable that the DC offset correcting section receives setting of a reference level and obtains the offset correction value in accordance with the difference between the reference level and the DC component.

According to this preferable embodiment, when a DC component level scheduled by a processing system which processes a reproduction signal is set as a reference level, a proper offset correction value is obtained and improvement of a signal quality by proper correction is realized.

A third data reproducer of the present invention which achieves the above object is a data reproducer which reproduces data from a recording medium which has a plurality of parallel linear tracks and in which the data is recorded along the tracks, wherein:

the recording medium has a first area along the tracks in which user data is recorded and a second area which precedes the first area along the tracks, the second area being used for correction of the reproducing timing of the user data and having pattern data whose auto correlation valve shows a peak only at a coincidence point, and the data reproducer comprises:

a head which faces the recording medium and reproduces the data recorded in the recording medium to obtain a reproduction signal;

a pattern comparing section which compares a reproduction signal obtained when a second area along a track to be reproduced by the head with the pattern data which must be reproduced from the second area;

a timing correcting section which corrects reproducing timing in accordance with a comparison result by the pattern comparing section; and a gain adjusting section which detects the gain of a reproduction signal obtained by the head in accordance with a comparison result by the pattern comparing section and adjust the gain.

According to the third data reproducer of the present invention, it is possible to accurately obtain the gain of the reproduction signal by using the comparison result by the pattern comparing section, correct the gain to the original gain suitable for signal processing, and improve a signal quality.

It is preferable that the third data reproducer of the present invention has a conformation that "the pattern comparing section obtains a cross-correlation value as a result of comparing the pattern data with the reproduction signal and the gain adjusting section detects the gain of the reproduction signal through comparison between the maximum value of cross-correlation values obtained by the pattern comparing section with a predetermined target maximum value".

According to the preferable third data reproducer, the gain of the reproduction signal can be accurately obtained because the maximum value of cross-correlation values is used.

Moreover, it is preferable that the third data reproducer of the present invention has a conformation that "the above head obtains an analog reproduction signal and the reproducer includes: a converting section for converting the analog reproduction signal obtained by the head into a digital reproduction signal constituted of a digital value string; and a digital filter which repeats the operation to obtain the sum total by multiplying each digital value in a partial block of the digital reproduction signal by a predetermined coefficient while shifting the partial block from the digital reproduction signal, and the gain adjusting section adjusts the gain of the reproduction signal by setting the coefficient of the digital filter". According to the third data reproducer of this embodiment, it is possible to easily and freely adjust the gain by setting the coefficient of the digital filter.

Moreover, in the case of this preferable embodiment, it is preferable that the digital filter is used for correction of the reproducing timing by the timing correcting section.

The digital filter is a circuit having a high versatility capable of serving as a digital equalizer or signal phase converter by properly setting the coefficient and it is also possible to provide plural functions for the filter. By providing a function for gain adjustment and a function for phase adjustment for the digital filter, it is possible to reduce a circuit scale.

BRIEF DESCRIPTION OF THE DRAWINGS

FIG. 3 is an illustration which shows sample data values reproduced from 1T continuous block and 4T continuous block.

BEST MODE FOR CARRYING OUT THE INVENTION

Embodiments of the present invention are described below.

Figure 1:
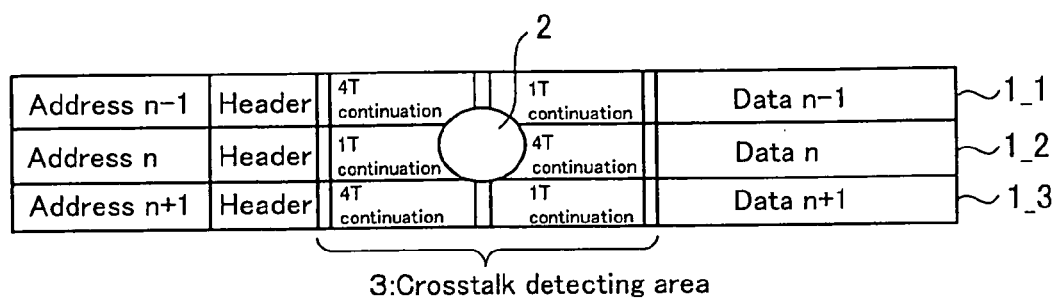
FIG. 1 is an illustration which shows an example of a format to be applied to a recording medium not to differentiate crosstalks from both tracks adjacent to each other in order to detect crosstalk.
Figure 2:
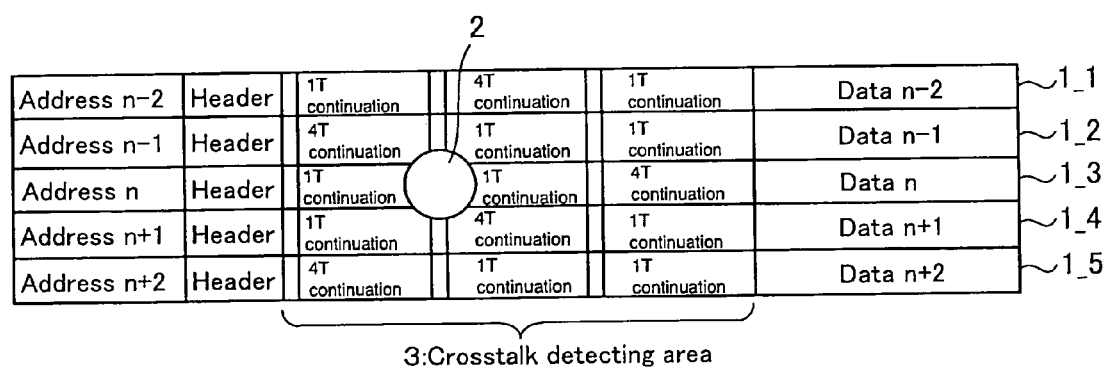
FIG. 2 is an illustration which shows an example of a format to differentiate crosstalk from which of both tracks adjacent to each other to be applied to a recording medium in order to detect crosstalk.
Figure 4:
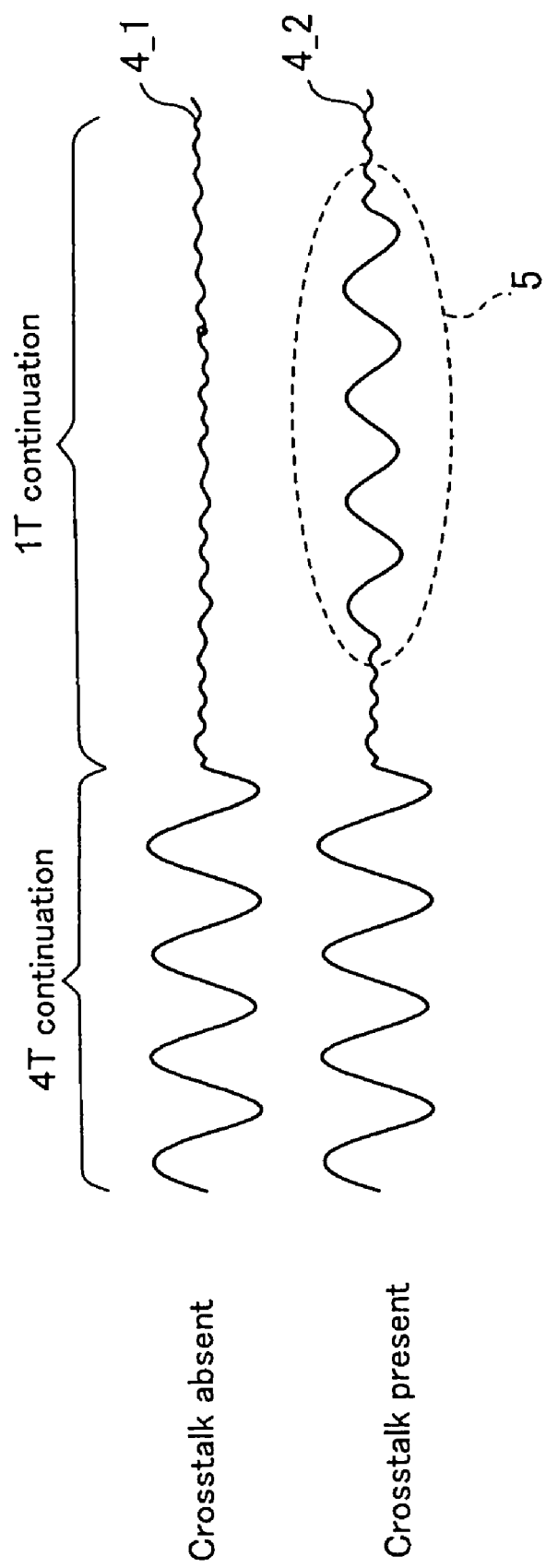
FIG. 4 is a conceptual view of crosstalk detection.
Figure 5:
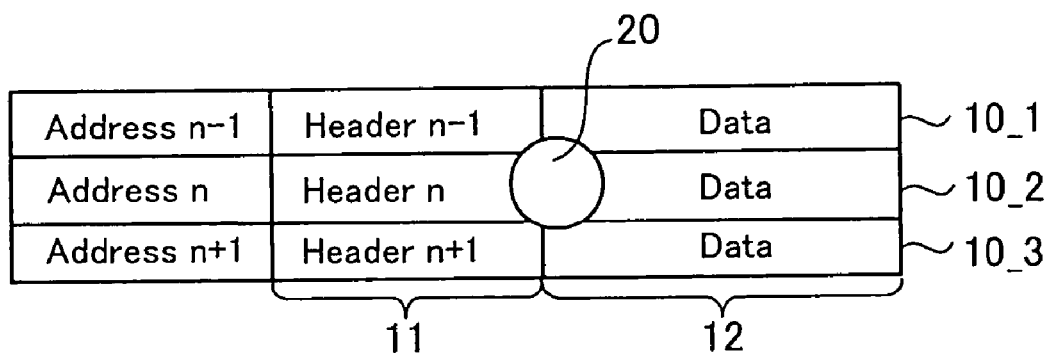
FIG. 5 is an illustration which shows a format concept to detect crosstalk in an embodiment.

FIG. 5 is an illustration which shows a format concept for detecting crosstalk in the present embodiment.

In the case of this embodiment, pattern data different between adjacent tracks is recorded in the header area 11 of each of tracks 10_1, 10_2, and 10_3 and the header area 11 also serves as a crosstalk detection area. Moreover, the pattern data recorded in the header area 11 is data which has large auto-correlation when patterns are matched used for phase adjustment of user data recorded in a data area 12 as described later. In the case of this embodiment, the pattern data is used for detection of crosstalk.

In the case of the present invention, it is possible to provide the function of the pattern data for address data. An example in which a header is prepared separately from address is described below.

Figure 6:
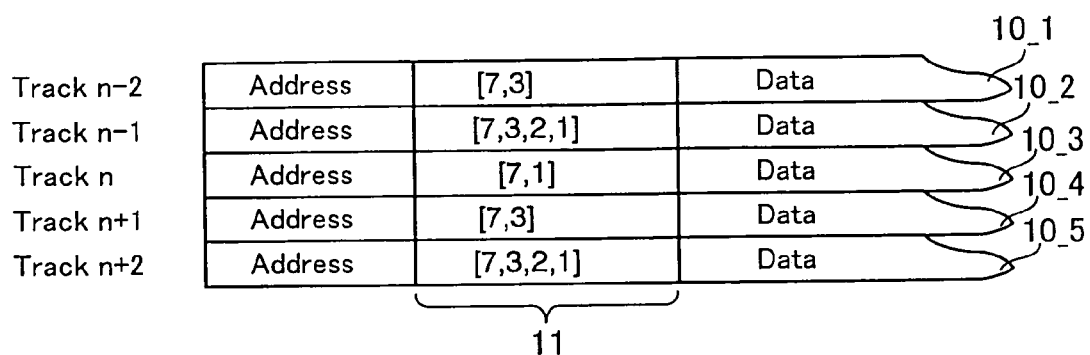
FIG. 6 is an illustration which shows a specific example of pattern data.

FIG. 6 is an illustration which shows a specific example of pattern data.

Figure 7:
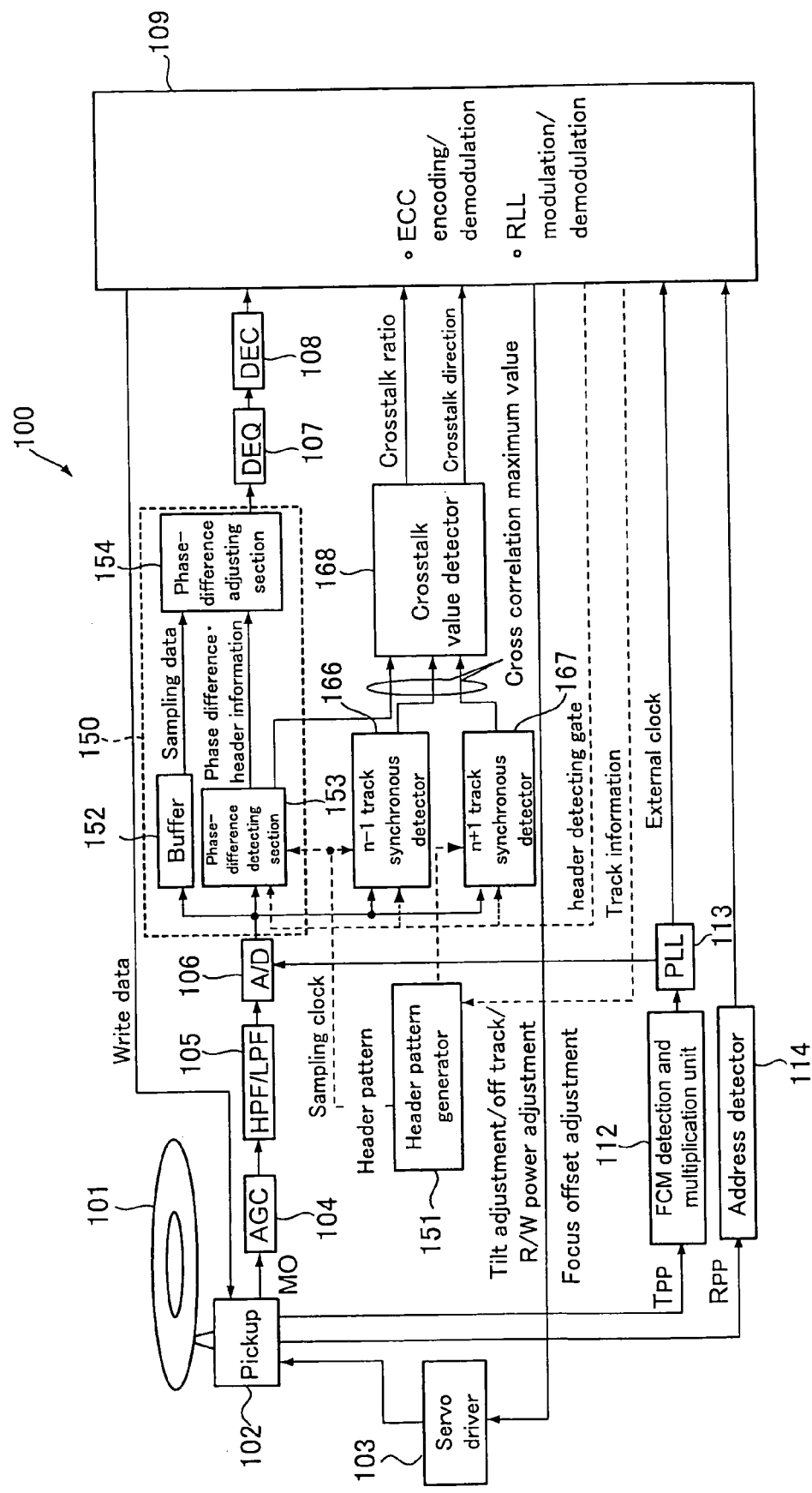
FIG. 7 is an illustration which shows an embodiment of a data reproducer of the present invention.

FIG. 6 shows five tracks 10_1, ..., and 10_5 and a 16-byte M sequence (Maximum sequence) is recorded in the header area 11 of each track as an example of the above pattern data. For example, an M sequence generated by the feedback method [7, 1] is recorded in the track 10_3 having track number "n". Moreover, an M sequence generated by each of three types of the feedback methods (7,1), (7,3), and (7,3,2,1) is recorded in the header area 11 of each track. For example, a M sequence generated by the feedback method (7,3,2,1) is recorded in the track 10_2 having a track number "n−1" adjacent to one hand of the track 10_3 having a track number "n" and an M sequence generated by the feedback method (7,3) is recorded in the track 10_4 having a track number "n+1" adjacent to the other hand. Thus, M sequences are different between adjacent tracks and M sequences are different between tracks adjacent to the both sides of an arbitrary track. FIG. 7 is an illustration which shows an embodiment of a data reproducer of the present invention.

The reproducing system of the data reproducer 100 shown in FIG. 7 is constituted of an optical pickup 102 which mainly receives the light reflected from an optical disk 101 by applying an optical beam to the optical disk 101 and converts the reflected light into an electrical signal, AGC (Automatic Gain Control) 104 which controls a signal gain constant by receiving a signal output from the optical pickup 102, analog equalizer 105, A/D converter 106, interpolating phase-difference correcting system 150, header pattern generator 151, digital waveform equalizer 107, demodulator 108 for demodulating a sampling value to binary data, fine clock mark (FCM) detector 112, PLL 113, and address mark detector 114.

The data reproducer 100 shown in FIG. 7 converts an MO signal (reproduction signal) reproduced from the optical disk 101 into user data by using an external clock system described below. In this case, the external clock system is a system which obtains a clock when reproducing data from a special fine clock mark embedded in a medium. In this case, an external clock is generated from a tangential push-pull (Tpp) signal from which a fine clock mark is reproduced by making the PLL 113 synchronous with a signal detected by the fine clock mark detector 112.

Figure 8:
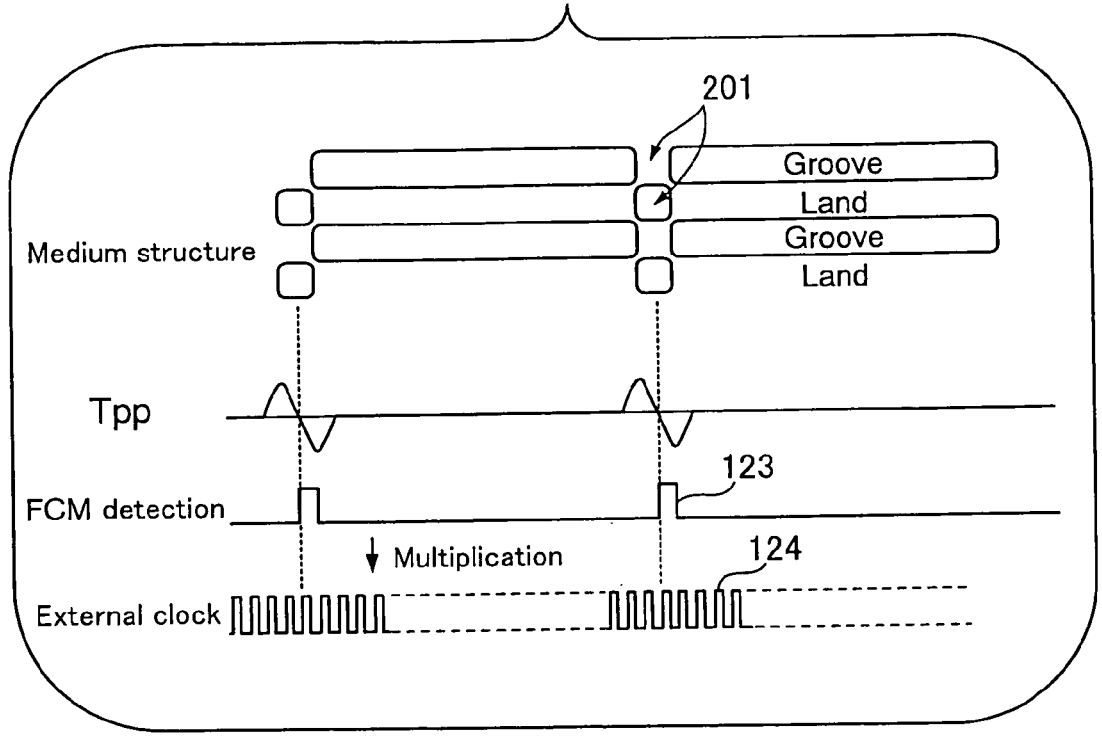
FIG. 8 is an illustration which shows a principle to generate an external clock signal from a fine clock mark (FCM) and a fine clock mark signal (Tpp) recorded on an optical disk.

FIG. 8 is an illustration which shows the principle to generate an external clock by the PLL 113 from a fine clock mark (FCM) 201 recorded in the optical disk 101 and a fine clock mark signal (Tpp). Description is continued below by referring to FIGS. 7 and 8.

A fine clock mark (FCM) 201 shown at the highest stage of FIG. 8 is reproduced by the optical pickup 102 using an optical beam. A Tpp signal shown at the middle stage of FIG. 8 is obtained when the fine clock mark (FCM) 201 is reproduced. The Tpp signal is detected by the fine clock mark detector 112, becomes a pulsed FCM detection signal 123, and is output from the fine clock mark detector 112. When the FCM detection signal 123 is multiplied by the PLL 113, an external clock (sampling clock) 124 is generated.

In the case of an MO signal reproduced from the optical disk 101 by the optical pickup 102, the signal amplitude is controlled by the AGC 104, waveform-equalized by the analog waveform equalizer 105, and then sampled by the A/D converter 106 which uses an external clock generated as described above as a sampling clock.

In this case, there is a phase difference between an MO signal sampled by the A/D converter 106 and a sampling clock input to the A/D converter 106 because a processing system for processing the MO signal is physically different from a generation system for generating a section clock. To optimally sample a reproduction signal, it is necessary to adjust the phase difference. Therefore, the interpolating phase-difference correcting system 150 is set to the data reproducer 100 shown in FIG. 7, after passing through the AGC 104 and the analog waveform equalizer 105, A/D conversion is performed by a sampling clock not necessarily synchronous with an optimum sampling point, and an obtained sampling signal is supplied to the interpolating phase-difference correcting system 150, phase-difference correction and data head detection adjustment are performed by the system 150, and the sampling signal is converted into a signal equal to the signal sampled at the optimum sampling point and output. Phase-difference correction by the interpolating phase-difference correcting system 150 corresponds to correction of the data reproducing timing. Moreover, a phase-difference corrected signal is waveform-equalized by the digital waveform equalizer 107, demodulated by the demodulator 108, sent to an optical disk control section 109, and output from the optical disk control section 109 as user data 130.

Details of the interpolating phase-difference correcting system 150 are described below.

As shown in FIG. 7, the interpolating phase-difference correcting system 150 includes a buffer 152 which temporarily stores sampling data, a phase-difference detecting section 153 which detects a phase difference by using a header pattern generated by the header pattern generator 151, and a phase-difference adjusting section 154 which adjusts the phase difference of the sampling data in accordance with the phase difference detected by the phase-difference detecting section 153.

Figure 9:
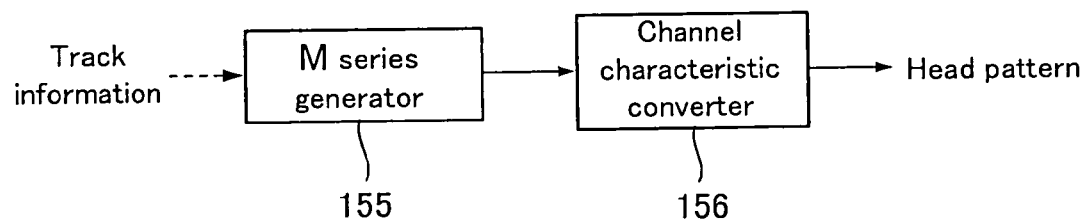
FIG. 9 is an illustration which shows a configuration of a header pattern generator.

FIG. 9 is an illustration which shows a configuration of a header pattern generator.

The header pattern generator is constituted of an M-sequence generator 155 which generates an M sequence corresponding to track information and a channel characteristic converter 156 which converts an M sequence in accordance with the 1+D characteristic of a reproducing channel and outputs the M sequence as a header pattern.

Figure 10:
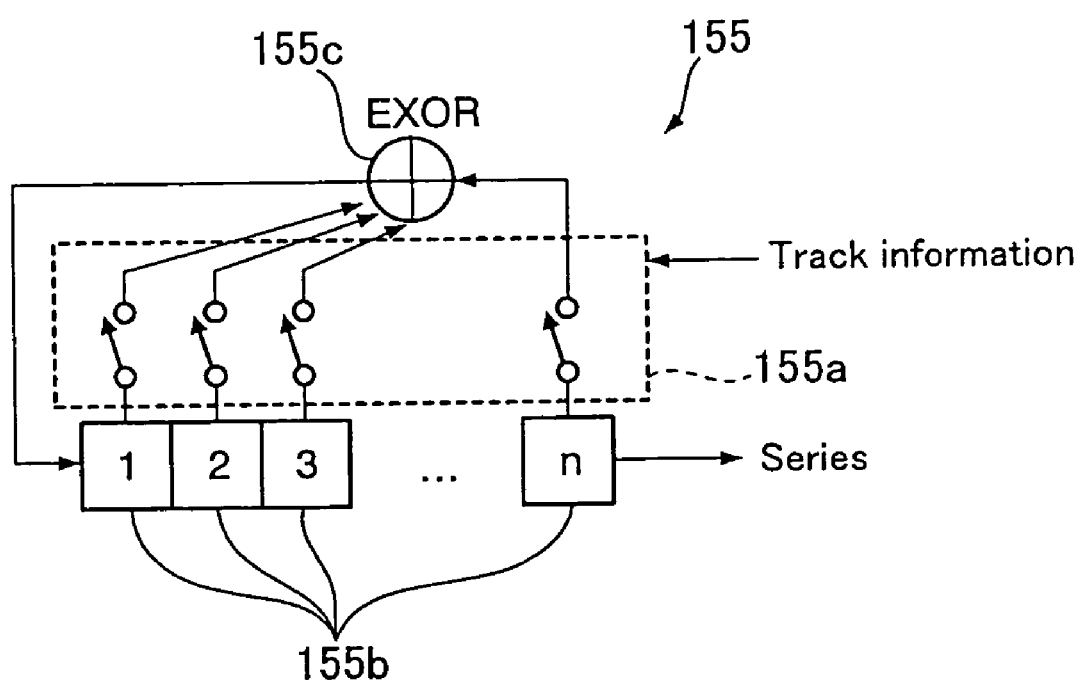
FIG. 10 is a conceptual block diagram of an M sequence generator.

FIG. 10 is a conceptual block diagram of the M-sequence generator 155.

The M-sequence generator 155 is provided with a switch group 155a which switches feedback methods in accordance with track information, n memories 155b which hold the data constituting an M sequence one bit by one bit, and a logical element 155c which applies an EXOR operation to the data selected by the switch group 155a from the data held by the memories 155b and returned. An operation result by the logical element 155c is sent to the first memory among n memories 155b, the data of each bit held by each memory 155b is successively passed on, and M-sequence data is successively output from the final n-th memory.

Figure 11:
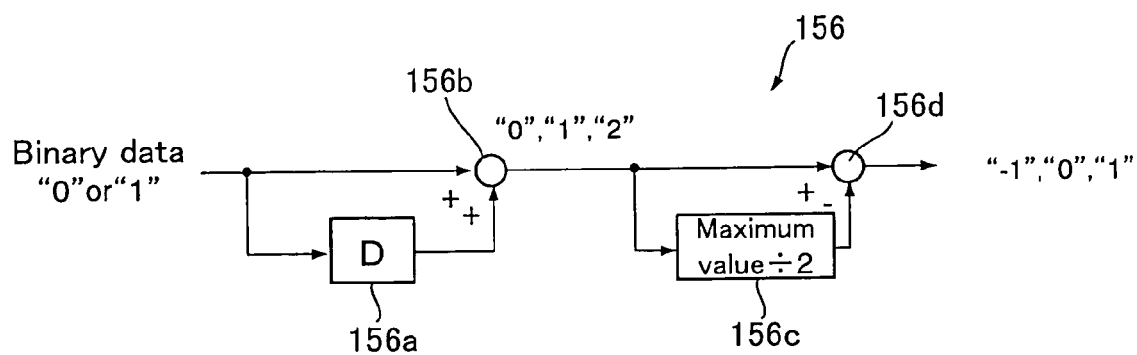
FIG. 11 is a conceptual block diagram of a channel characteristic converter.

FIG. 11 is a conceptual block diagram of the channel characteristic converter 156.

The channel characteristic converter 156 is constituted of a delay device 156a, adder 156b, divider 156c, and subtracter 156d. when a binary data string of "0" and "1" is input to the channel characteristic converter 156, the data string is delayed by one data value by the delay device 156a, the delayed data string and the original data string are added by the adder 156b and become a three-valued data string of "0", "1", and "2". Thereafter, the half value of the maximum value in the data string (in this case, "2") is calculated by the divider 156c, the half value is subtracted from each data of the three-valued data string by the subtracter 156d, and a three-valued data string of "−1", "0", and "1" is obtained. In the case of a data string thus obtained by being converted by the channel characteristic converter 156, the sum total of data levels becomes "0" when the original binary data string is a data string in which the number of "0s" is equal to the number of "1s" like an M sequence.

Thus, a header pattern which is generated by the M-sequence generator 155 and in which the sum total of data levels become "0" by the channel characteristic converter 156 is generated by the header pattern generator 151 shown in FIGS. 7 and 9 and this header pattern is input to the phase-difference detecting section 153 of the interpolating phase-difference correcting system 150.

Figure 12:
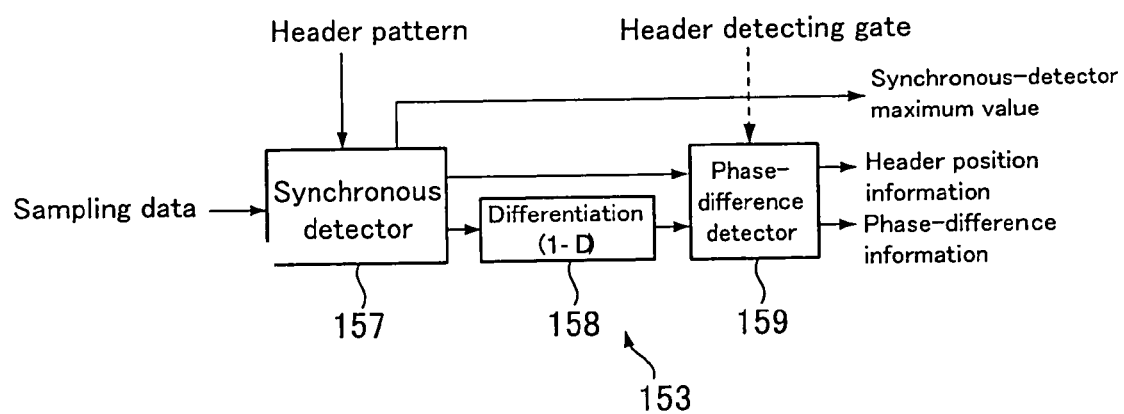
FIG. 12 is a block diagram of a phase-difference detector.

FIG. 12 is a block diagram of the phase-difference detecting section 153.

In this case, the phase-difference detecting section 153 is constituted of a synchronous detector 157, differentiator 158, and phase-difference detector 159. The synchronous detector 157 calculates the cross correlation value between sampling data and a header pattern as a function value which changes in accordance with the change of the sampling data with time and the differentiator 158 calculates the differential value of the cross correlation value. Then, the phase-difference detector 159 calculates a phase difference and a header position in accordance with the cross correlation value and differential value when a header detection gate is in an assert state.

Figure 13:
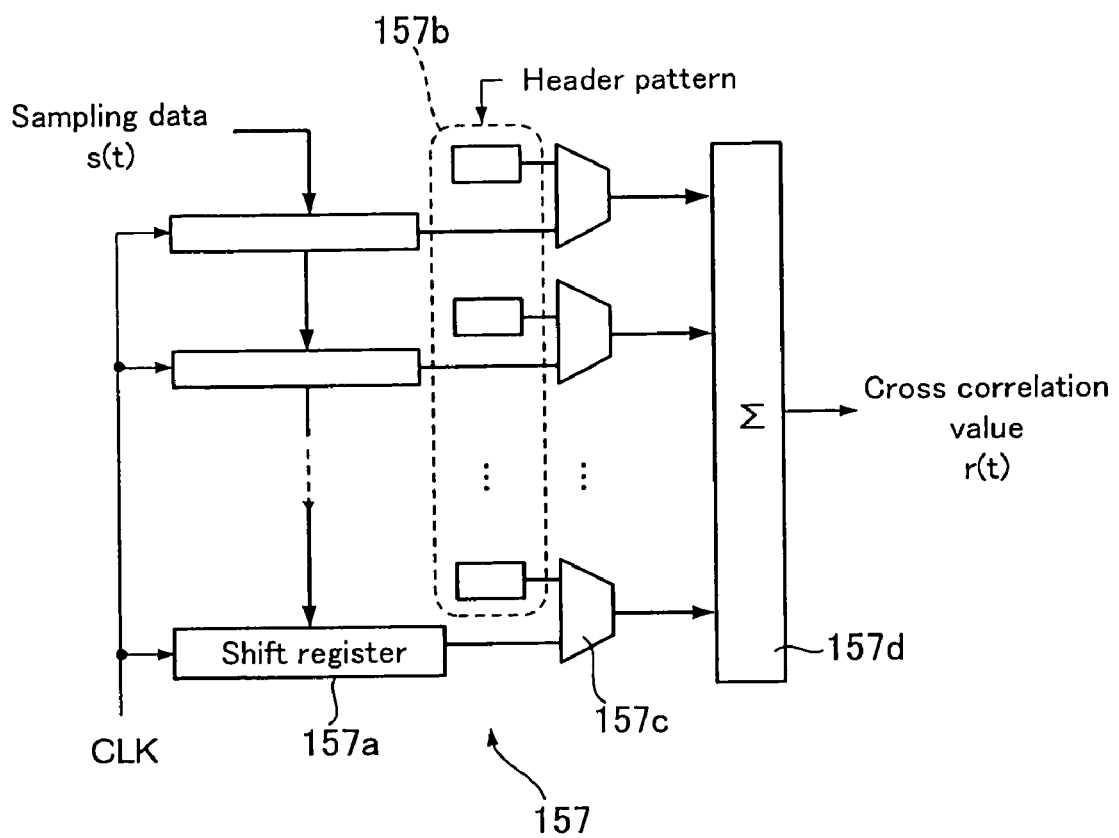
FIG. 13 is a block diagram of a synchronous detector.

FIG. 13 is a block diagram of the synchronous detector 157.

The synchronous detector 157 is constituted of a shift register 157a which stores sampling data s (t) to be compared with a header pattern and shifts the data one clock by one clock, a resister group 157b in which a reference header pattern is stored, a predetermined number of multipliers 157c, and a summing amplifier 157d which calculates the sum total of outputs of the multipliers 157c.

A sampling value stored in each section of the shift register 157a and a head pattern value stored in each register of the register group 157b are multiplied by each multiplier 157c, the sum total of outputs of the multipliers 157c is calculated by the summing amplifier 157d, and the sum total is output as a cross correlation value r(t).

The cross correlation value r(t) thus output by the summing amplifier 157 and a differential cross correlation value r' (t) obtained when the cross correlation value r(t) is differentiated by the above differentiator 158 are input to the phase-difference detector 159.

Figure 14:
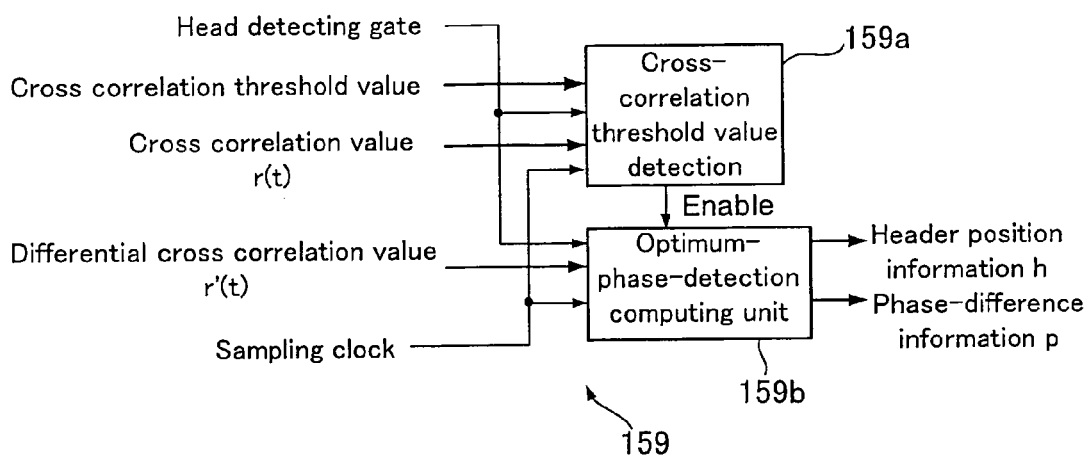
FIG. 14 is a block diagram of a phase-difference detector.

FIG. 14 is a block diagram of the phase-difference detector 159.

The phase-difference detector 159 is mainly constituted of a cross-correlation-value detector 159a and an optimum-position-detection computing unit 159b. Each phase-difference detector 159 operates while a header detection gate is in an assert state and a header detection gate, the cross correlation value r(t), and a threshold value are input to the cross-correlation threshold value detector 159a. When the cross correlation value r(t) exceeds the threshold value, the cross-correlation threshold-value detector 159a sends the cross correlation value r(t) to the optimum-phase-difference-detection computing unit 159b.

In the case of the optimum-phase-difference-detection computing unit 159b, header position information h is updated and output when the sent cross correlation value becomes larger than the maximum value before the cross correlation value or when the maximum value is updated. Moreover, the computing unit 159b obtains a zero cross position of the differential cross correlation value r' (t) and outputs phase-difference information p.

Thus, the phase-difference detecting section 153 shown in FIGS. 7 and 12 obtains and outputs the header position information h and phase-difference information p. The maximum value of the cross correlation value obtained by the above synchronous detector 157 is also output. The phase-difference information p is supplied to the phase-difference adjusting section 154 together with the sampling data stored in the buffer shown in FIG. 7.

Figure 15:
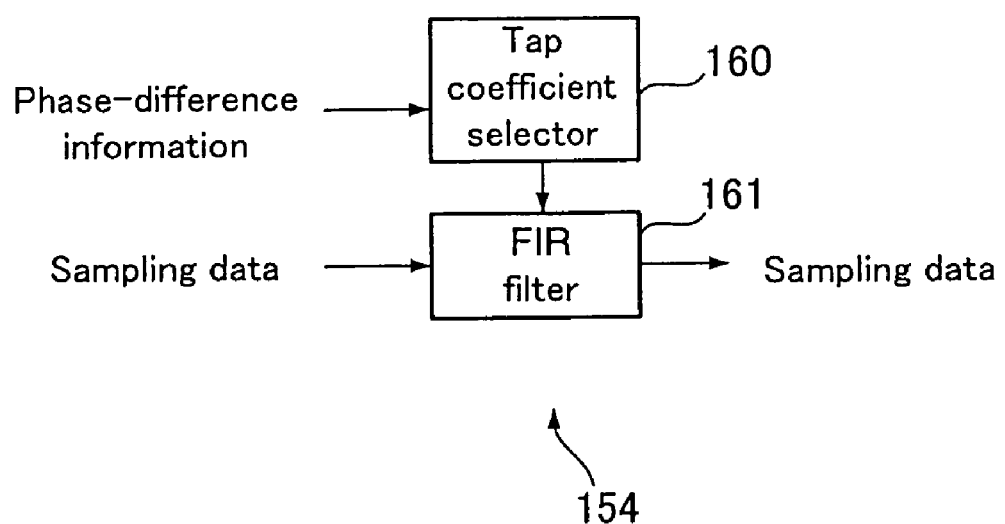
FIG. 15 is a block diagram of a phase-difference adjusting section.

FIG. 15 is a block diagram of the phase-difference adjusting section 154.

The phase-difference adjusting section 154 is constituted of a tap coefficient selector 160 and an FIR filter 161, the phase-difference information p is input to the tap coefficient selector 160, and sampling data is input to the FIR filter 161. The tap coefficient selector 160 selects a tap coefficient to obtain an interpolation value equal to the sampling data sampled at optimum sampling timing based on the phase-difference information p.

Figure 16:
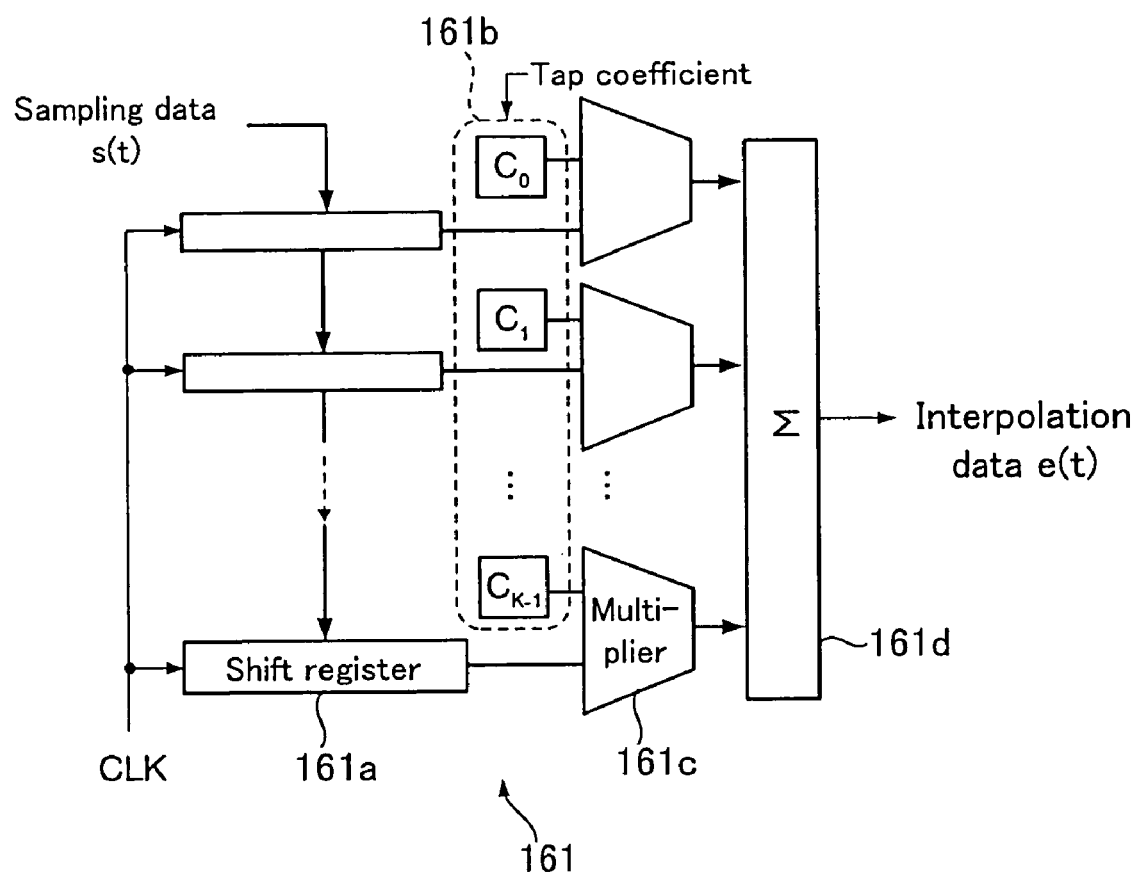
FIG. 16 is a block diagram of an FIR filter.

FIG. 16 is a block diagram of the FIR filter 161.

The FIR filter 161 is constituted of a shift register 161a which stores the sampling data s(t) and shifts it one clock by one clock, a register group 161b in which a selected tap coefficient is stored, a predetermined number of multipliers 161c, and a summing amplifier 161d which calculates the sum total of outputs of the multipliers 161c.

A sampling value stored in each section of the shift register 161a and a tap coefficient stored in each register of the register group 161b are multiplied by each multiplier 161c and the sum total of outputs of the multipliers 161c is calculated by the summing amplifier 161d. The sum total is interpolation data e(t) equal to the sampling data sampled at proper sampling timing and the interpolation data e(t) is output as the sampling data whose phase is adjusted.

Then, a generation procedure of a header detection gate which controls the operation timing of the above-described interpolating phase-difference correcting system 150 is described below.

Figure 17:
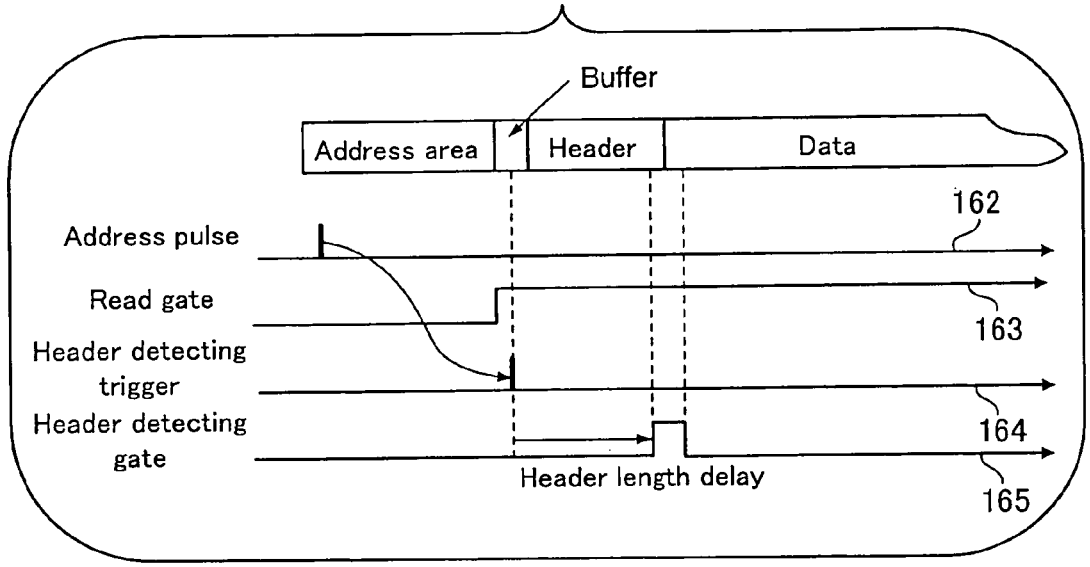
FIG. 17 is a timing chart which shows a header-detection-gate generation procedure.

FIG. 17 is a timing chart which shows a generation procedure of a header detection gate. When a predetermined addressing mark included in an address area is detected by the address detector 114 shown in FIG. 7, an address pulse signal 162 is generated. A read gate 163 becomes an assert state so that read of an MO signal is started from a buffer area on the basis of the point of time of rise of the address pulse signal 162 and a header detection trigger 164 rises in the buffer area. Then, a header detection gate 165 becomes an assert state by delaying by a header length from rise of the header detection trigger 164, and operations of the above interpolating phase-difference correcting system 150 are executed. As a result, the sampling data (reproduction signal) in which the user data in the data area is sampled is corrected to the data (signal) sampled at optimum timing from the head of the data and output from the interpolating phase-difference correcting system 150.

As described above, a function to correct the reproducing timing of a reproduction signal and improve the signal quality is built in the data reproducer 100 shown in FIG. 7. Moreover, a function to accurately detect crosstalk and improve the signal quality is also built in the data reproducer 100. This function is described below.

To detect crosstalk, a front-track synchronous detector 166, rear-track synchronous detector 167, and crosstalk value detector 168 are built in the data reproducer 100. The front-track synchronous detector 166 and rear-track synchronous detector 167 respectively have a structure completely the same as that of the synchronous detector 157 (refer to FIG. 12) included in the above phase-difference detector 153. The front-track synchronous detector 166 calculates the cross correlation value between a header pattern corresponding to a track one before the track to be reproduced and sampling data and the rear-track synchronous detector 167 calculates the cross correlation value between a header pattern corresponding to a track one after the track to be reproduced and sampling data. Moreover, the crosstalk value detector 168 obtains a crosstalk ratio and crosstalk direction (before or after a track which becomes an occurrence cause) in accordance with each maximum value of cross correlation values output from the synchronous detector 157 (refer to FIG. 12), front-track synchronous detector 166, and rear-track synchronous detector 167.

The above header pattern generator 151 generates not only a header pattern for the synchronous detector 157 (refer to FIG. 12) included in the phase-difference detector 153 but also header patterns for the front-track synchronous detector 166 and rear-track synchronous detector 167.

Figure 18:
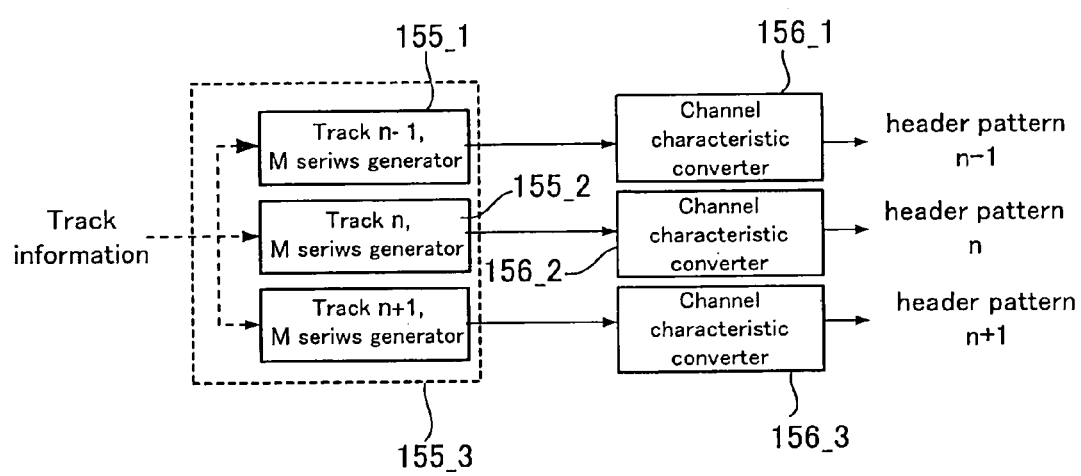
FIG. 18 is an illustration which shows a configuration of a header pattern generator again.

FIG. 18 is an illustration which shows a configuration of the header pattern generator 151 again.

As described by referring to FIG. 9, the header pattern generator 151 is provided with the M-sequence-string generator 155 and channel characteristic converter 156. More minutely, as shown in FIG. 18, the generator 151 is provided with three M-sequence generators 155_1, . . . , and 155_3, and three channel characteristic converters 156_1, . . . , and 156_3. Moreover, not only the header pattern of a track having a track number "n" to be reproduced but also header patterns of track numbers "n−1" and "n+1" before and after the header pattern of the track having the track number "n" are generated.

Three types of header patterns thus generated are input to the above synchronous detector 157 (refer to FIG. 12), front-track synchronous detector 166 (refer to FIG. 7), and rear-track synchronous detector 167 (refer to FIG. 7), respectively and cross correlation values are calculated. Moreover, crosstalk is detected by the crosstalk value detector 168 shown in FIG. 7.

Figure 19:
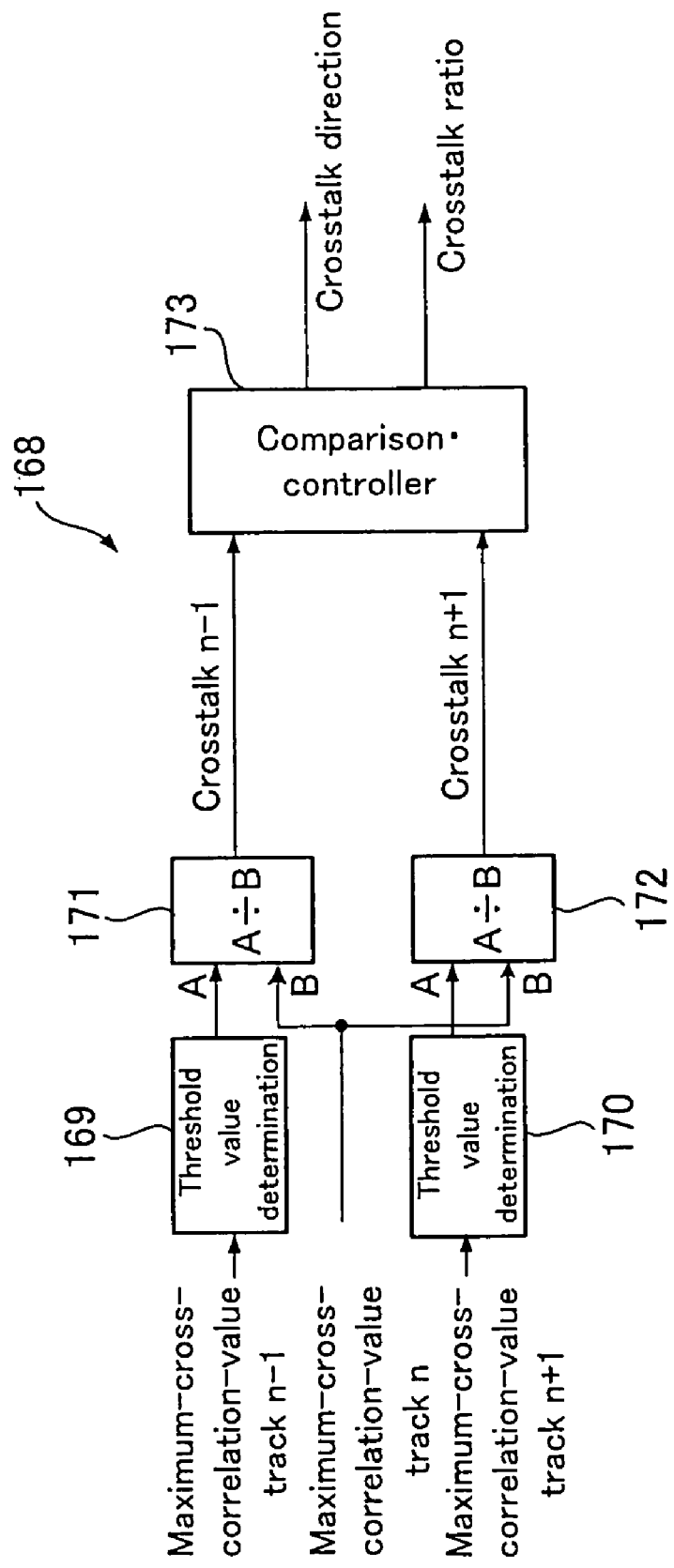
FIG. 19 is a block diagram of a crosstalk value detector.

FIG. 19 is a block diagram of the crosstalk value detector 168.

The crosstalk value detector 168 is provided with two threshold-value determiners 169 and 170, two dividers 171 and 172, and one comparison controller 173. A threshold value is set to two threshold-value determiners 169 and 170 from firm and a maximum cross correlation value to header patterns of adjacent tracks is compared with the threshold value by each of the threshold-value determiners 169 and 170. When the maximum cross correlation value exceeds the threshold value, it is determined that crosstalk is present, the maximum cross correlation value is sent to the dividers 171 and 172, and divided by a maximum cross correlation value to the header pattern of a track to be reproduced. Thereby, crosstalk is obtained from tracks adjacent to a track to be reproduced. Moreover, those crosstalks are compared by the comparison controller 173 and it is obtained that what degree of crosstalk has occurred in which track.

Figure 20:
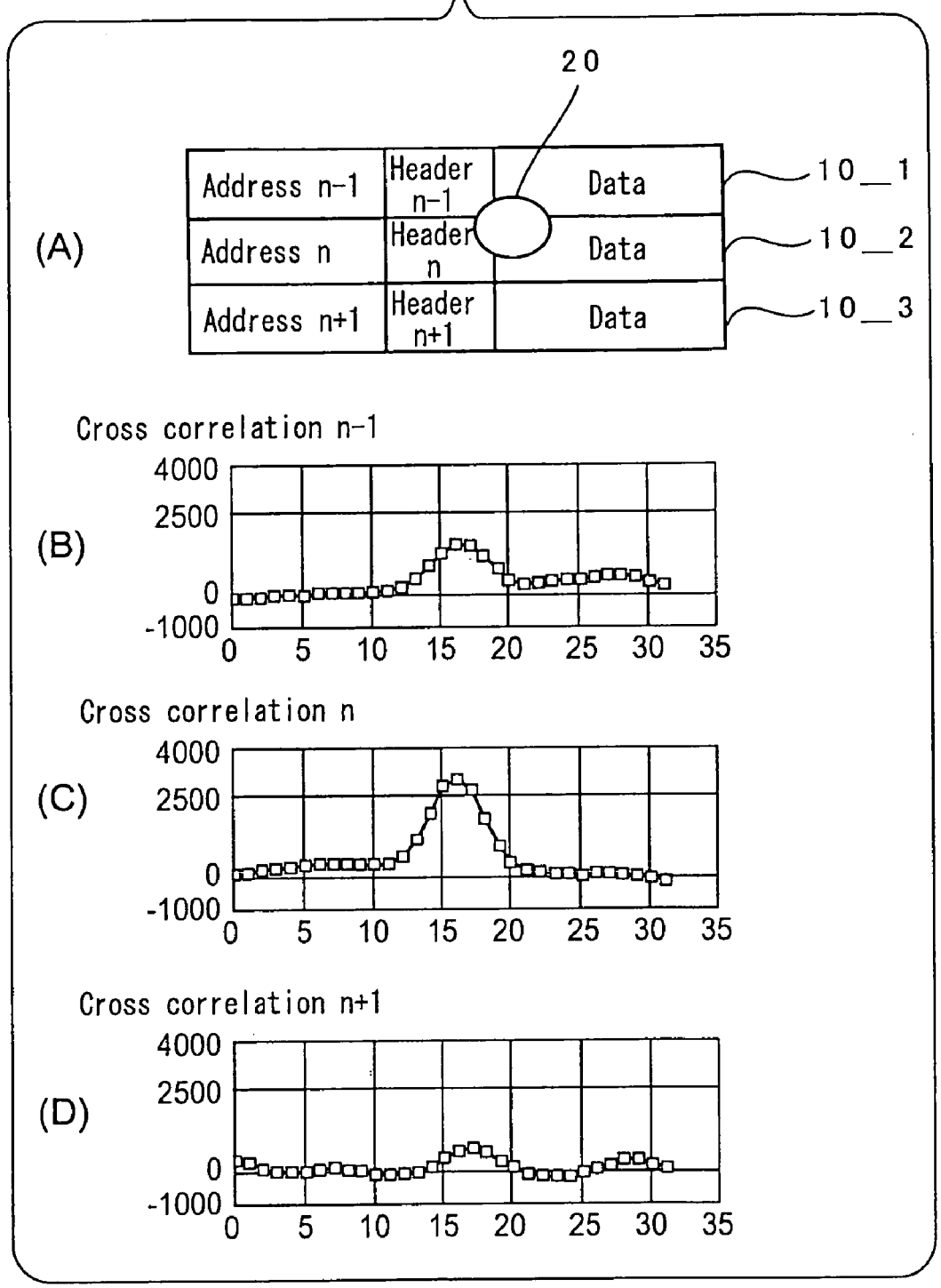
FIG. 20 is an illustration which shows a first detection example of crosstalk.
Figure 21:
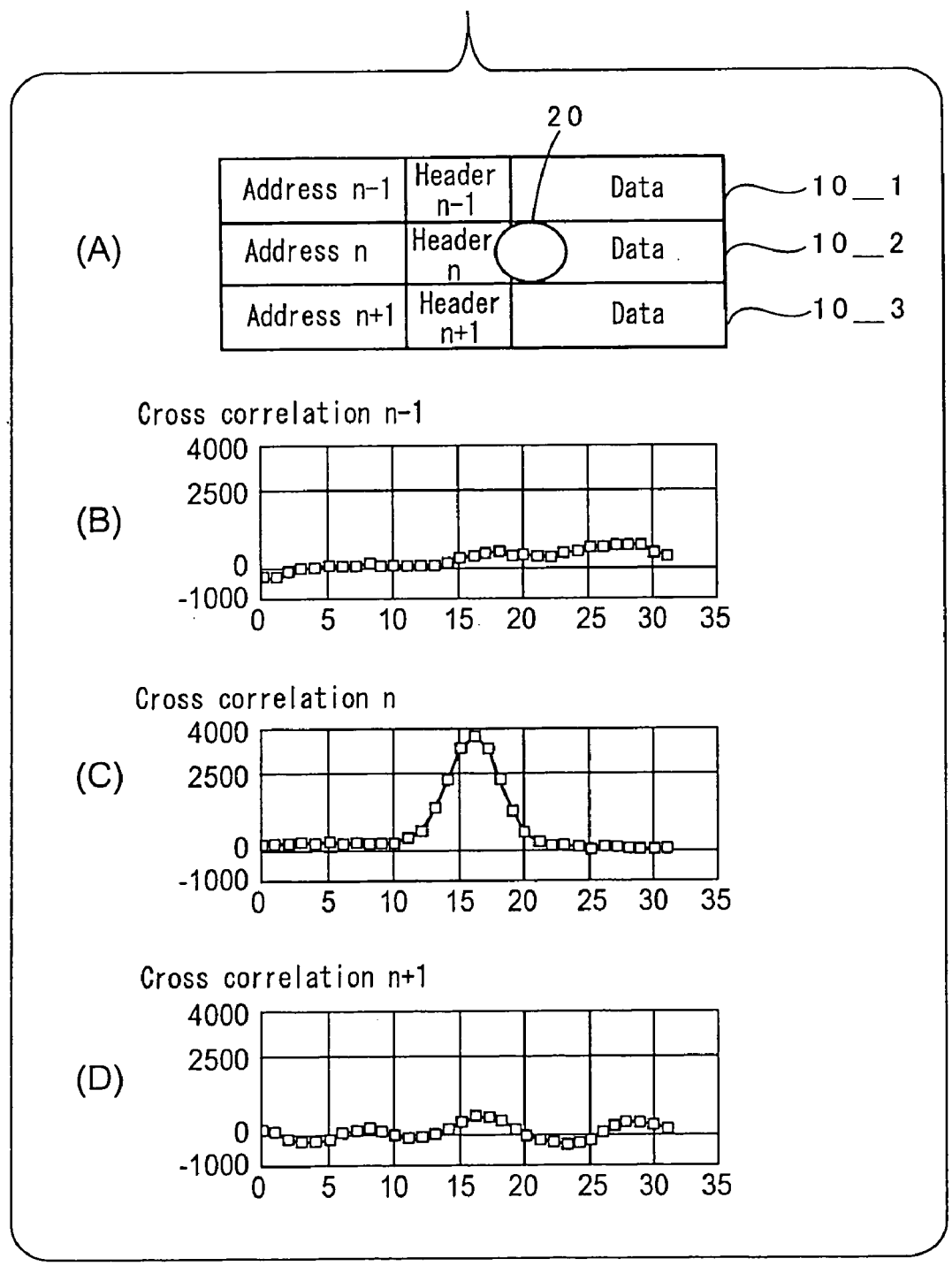
FIG. 21 is an illustration which shows a second detection example of crosstalk.
Figure 22:
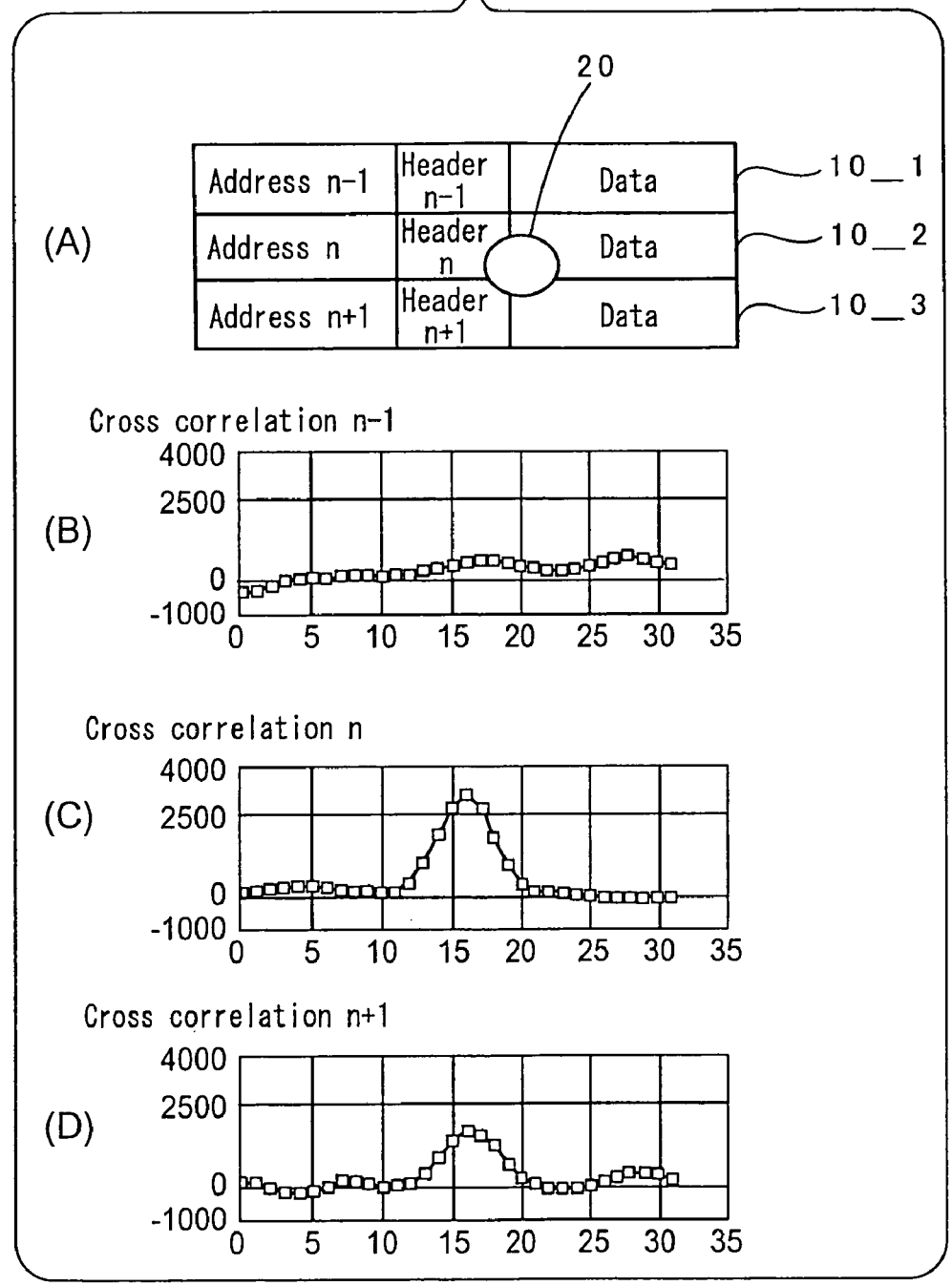
FIG. 22 is an illustration which shows a third detection example of crosstalk.

FIGS. 20 to 22 are illustrations which show detection examples of crosstalk.

The position of a beam spot 20 is shown at the highest stage (A) of each figure and the graph of a cross correlation value by the head pattern of a "front"-side track 10_1, the graph of a cross correlation value by the head pattern of a track 10_2 to be reproduced, and the graph of a cross correlation value by the head pattern of a "rear" side track 10-13 are shown at the second stage (B), third stage (C), and the lowest stage (D), respectively.

As shown at the highest stage (A) of FIG. 20, when the position of the beam spot 20 is deviated to the "front" track 10_1 side from the center of the track 10_2 to be reproduced, it is clearly known that a large peak occurs in the graph shown at the third stage (C) and a slightly small peak occurs in the graph shown at the second stage (B), and crosstalk due to the "front" side track 10_1 occurs.

Moreover, as shown at the highest stage (A) in FIG. 21, when the position of the beam spot 20 is present at the center of the track 10_2 to be reproduced, it is found that a peak occurs only in the graph shown at the third stage (C), no peak occurs in the graphs shown at the second stage (B) and the lowest stage (D), and no crosstalk occurs.

Furthermore, as shown at the highest stage (A) in FIG. 22, when the position of the beam spot 20 is deviated to the "rear" track 10_3 side from the center of the track 10_2 to be reproduced, it is clearly known that a large peak occurs in the graph shown at the third stage (C), a slightly small peak occurs in the graph shown at the lowest stage (D), and crosstalk due to the "rear" side track 10_3 occurs.

Thus, it is possible to accurately detect crosstalk in accordance with the crosstalk detection which uses a cross correlation value.

In the case of the reproducer 100 shown in FIG. 7, when crosstalk is detected, a servo driver 103 of the optical pickup 102 is controlled by the optical disk control section 109 in order to reduce the crosstalk and the following are performed: adjustment of a reproducing position of the optical pickup 102 to a track to be reproduced (off-track adjustment), adjustment of an angle for the optical pickup 102 to face the optical disk 101 (tilt adjustment), write power adjustment, read power adjustment, and adjustment of the distance between the optical pickup 102 and the optical disk 101 (focus offset adjustment).

In the case of this embodiment, these adjustments are executed in accordance with the crosstalk detected as described below. Firstly, rough adjustment is executed in accordance with the crosstalk detected at the time of a recording/reproducing test executed in a test area before recording/reproducing of data in or from the optical disk 101. Secondly, fine adjustment is sequentially executed in accordance with the crosstalk detected when actually reproducing data. Thirdly, individual adjustment is executed in accordance with the crosstalk detected when failing in recording/reproducing of data. However, only first adjustment is applied to write power adjustment in order to avoid occurrence of crosswrite.

Among the above various types of adjustments, the off-track adjustment corrects a shift of the beam spot 20 shown in FIGS. 20 and 22 and a beam spot is moved in the direction opposite to the crosstalk direction.

Then, the tilt adjustment is described.

Figure 23:
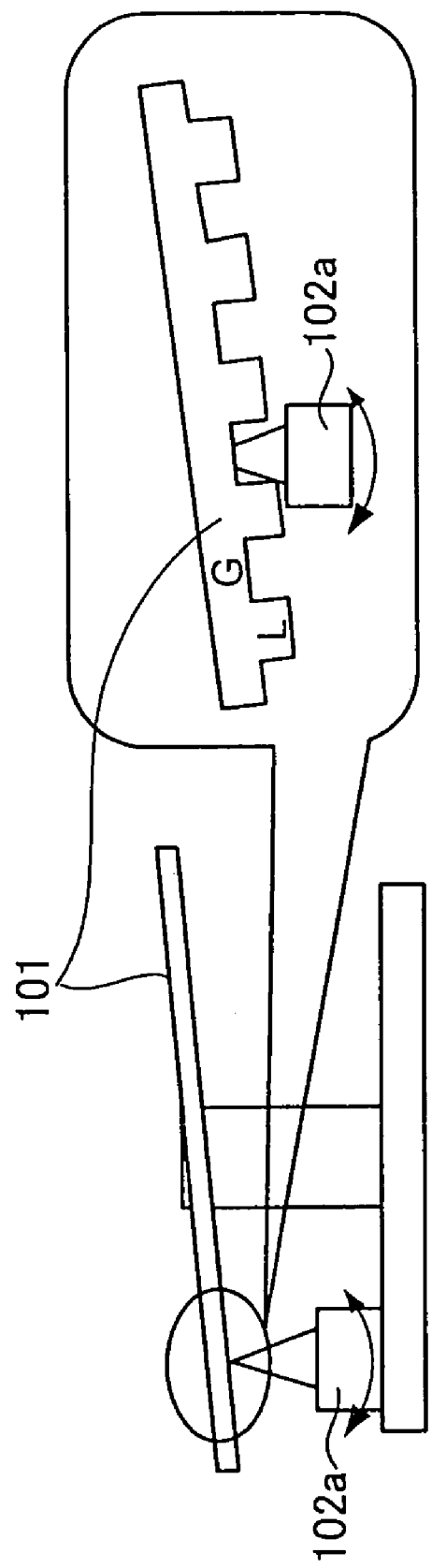
FIG. 23 is a conceptual diagram which describes tilt adjustment.

FIG. 23 is a conceptual diagram to describe the tilt adjustment.

As shown in FIG. 23, when the optical disk 101 tilts from a lens 102a of an optical pickup, a beam spot is deformed. Therefore, reduction of crosstalk becomes insufficient by only the above off-track adjustment. Therefore, an actuator which adjusts the tilt of the lens 102a is built in this embodiment and the lens 102a is tilted in the direction for crosstalk to decrease by the actuator.

Then, among the above various types of adjustments, the write power adjustment, read power adjustment, and focus offset adjustment are described below.

When write power or read power is too strong or a focus position is shifted, a beam spot size becomes a size larger than a preferable size and crosstalk occurs.

Figure 24:
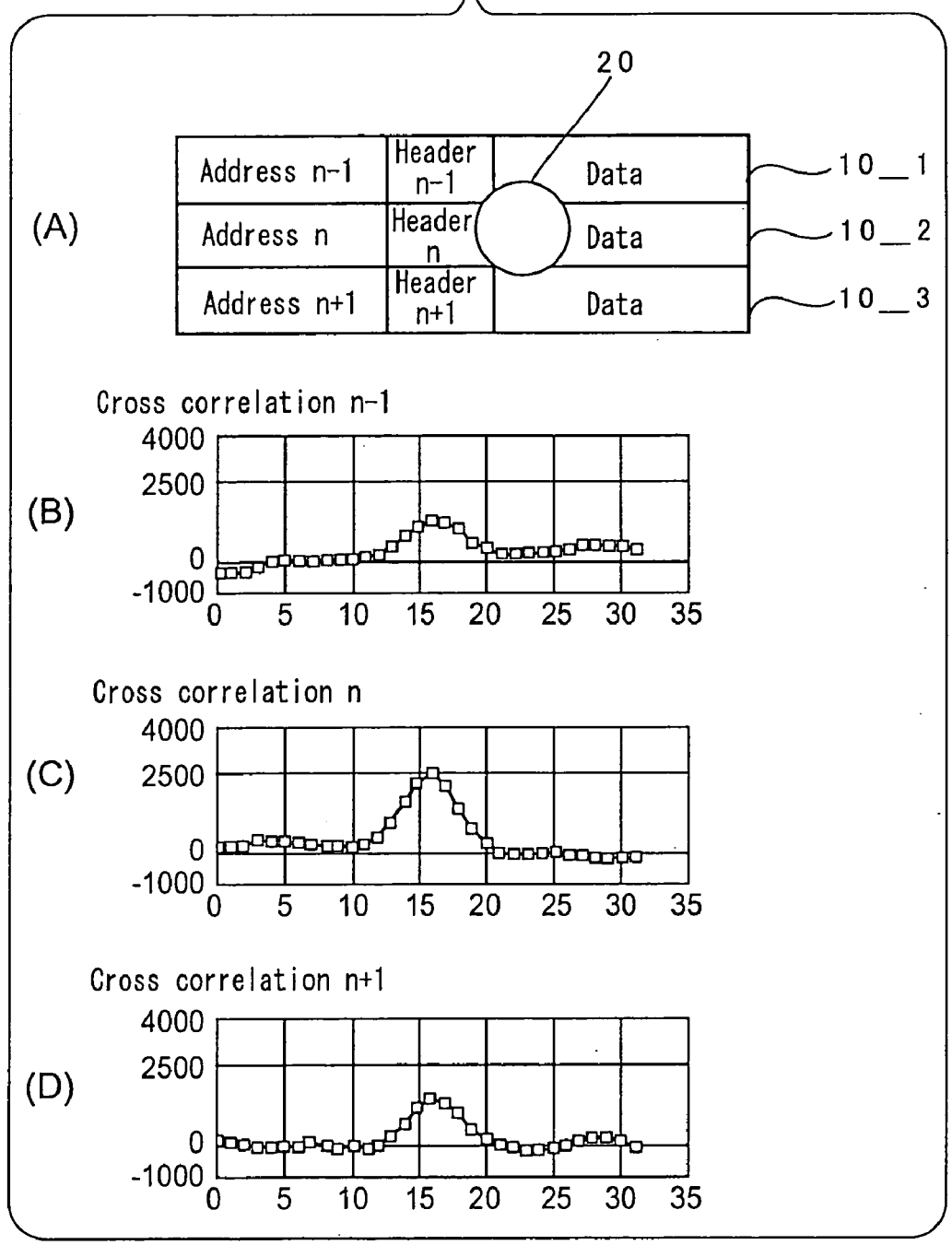
FIG. 24 is an illustration which shows a fourth detection example of crosstalk.

FIG. 24 is an illustration which shows a fourth detection example of crosstalk.

Also in the case of FIG. 24, the position of the beam spot 20 is shown at the highest stage (A) and graphs of correlation functions by head patterns of tracks 10_1, 10_2, and 10_3 are shown at the other stages (B), (C), and (D).

As shown in FIG. 24, when the size of the beam spot 20 increases, the beam spot 20 hangs on the both tracks 10_1 and 10_3 adjacent to the track 10_2 to be reproduced. As a result, as shown at the second stage (B) and lowest stage (D), it is clearly known that a slightly small peak occurs in each correlation value and crosstalk occurs from the tracks 10_1 and 10_3 adjacent at the both sides.

Thus, when crosstalks in the both directions occur, the crosstalks are decreased by the power adjustment (lowering) or focus offset adjustment.

Figure 25:
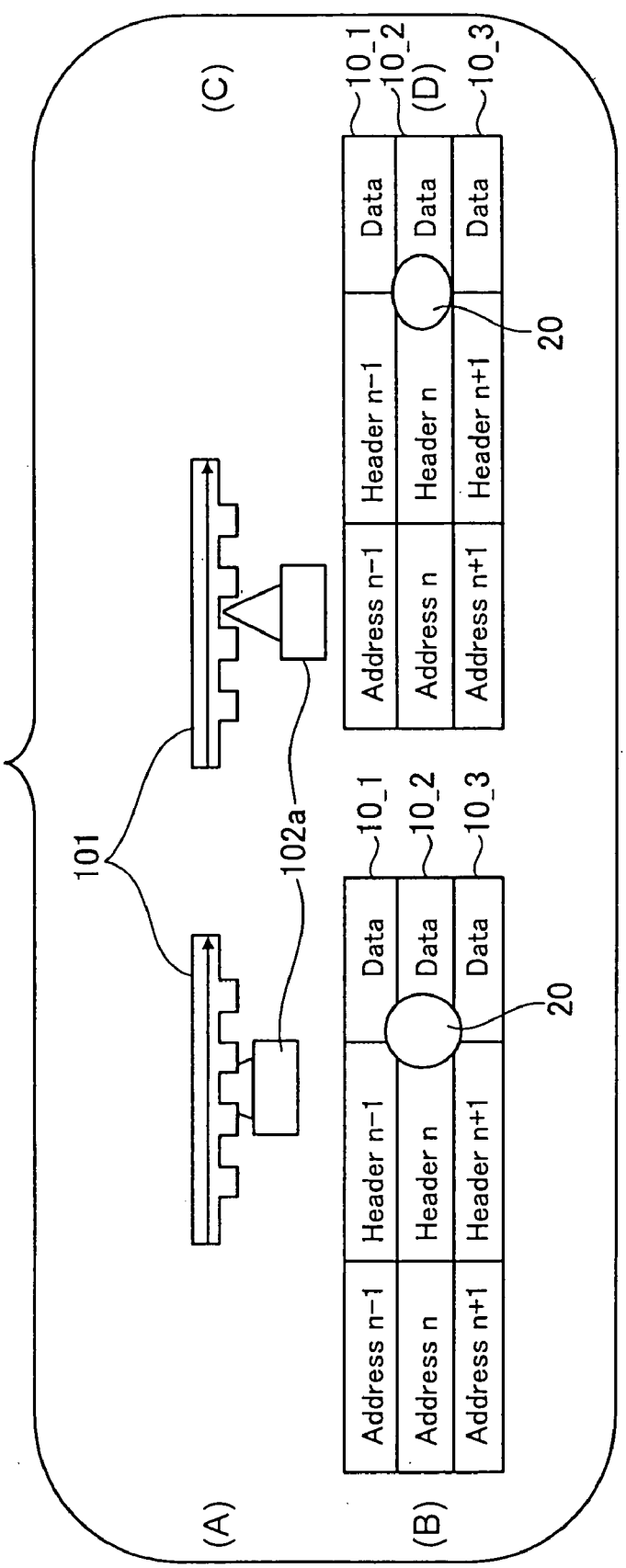
FIG. 25 is a conceptual diagram of focus offset adjustment.

FIG. 25 is a conceptual diagram of the focus offset adjustment.

As shown by the part (A) of FIG. 25, when the distance of the lens 102a from the optical disk 101 is insufficient (too close in this case), the size of the beam spot 20 is increased due to out of focus as shown by the part (B) and the above crosstalk is detected. The position of the lens 102a is adjusted so that the crosstalk is decreased and the lens 102a moves to a proper distance as shown by the part (C). In this case, the beam spot 20 becomes a sufficiently small size as shown by the part (D).

Thus, description of the first embodiment of the present invention is completed and then, another embodiment of the present invention is described below. A function which improves the quality of a reproduction signal by detecting and decreasing crosstalk is built in the above first embodiment. A function which corrects offset of a signal intensity of a reproduction signal and a gain defect of the reproduction signal and improves the quality of the reproduction signal is built in each embodiment described below. Because each embodiment described below is the same as the above first embodiment except the above point, only the function which corrects the offset of a signal intensity or gain defect of a reproduction signal is described below.

Figure 26:
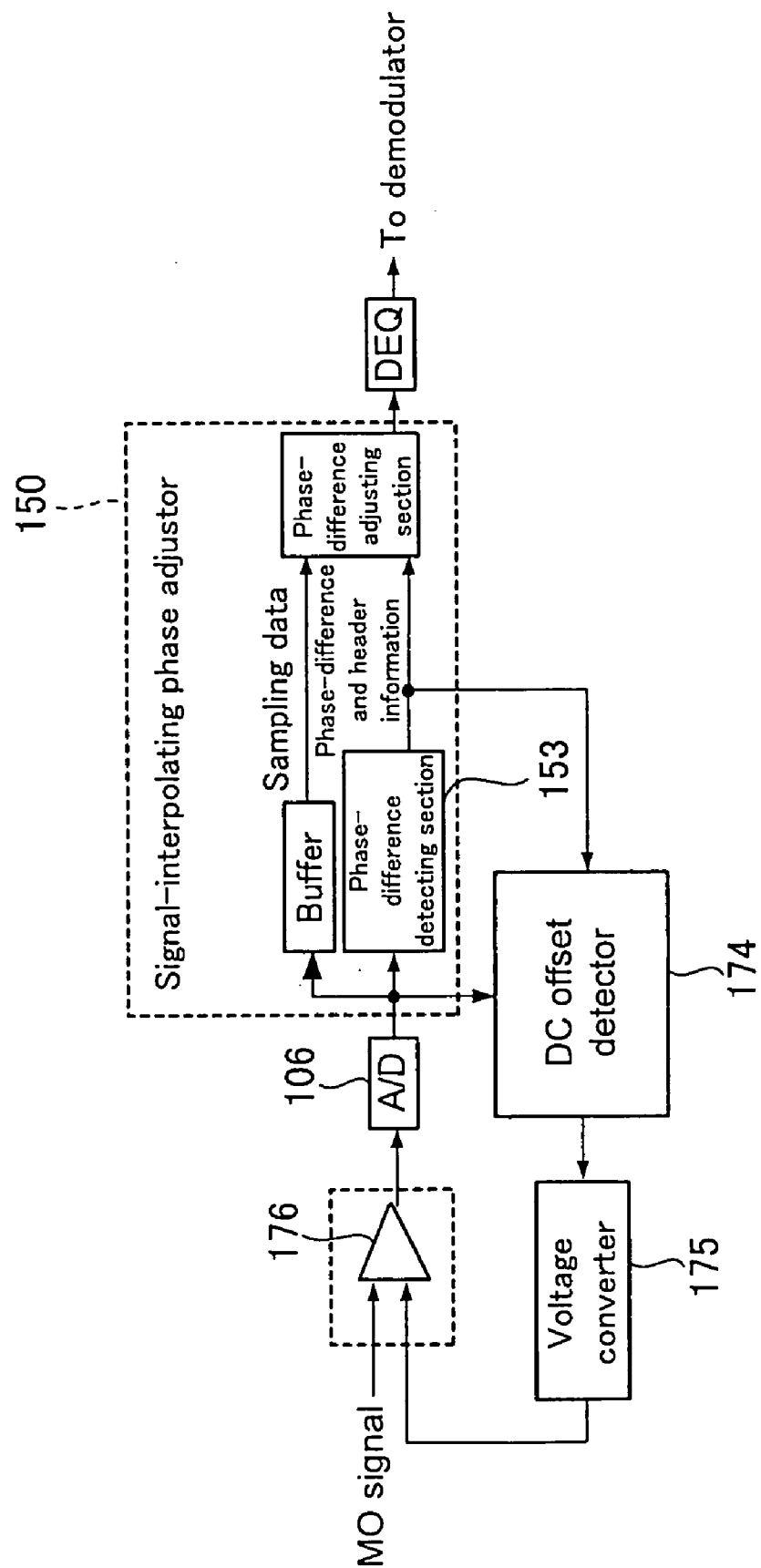
FIG. 26 is an illustration which shows a configuration section which takes charge of a correction function for correcting the offset of a signal intensity built in second embodiment.

FIG. 26 is an illustration which shows a configuration section to take charge of the correction function of the offset of a signal intensity built in the second embodiment.

Among the configuration sections shown in FIG. 26, a section provided with the same symbol as a symbol in FIG. 7 is the same as the configuration section described by referring to FIG. 7.

To correct the offset of a signal intensity, a DC offset detector 174, voltage converter 175, and offset adjusting amplifier 176 are built in the configuration section.

In this case, a DC offset to be corrected is first described.

Figure 27:
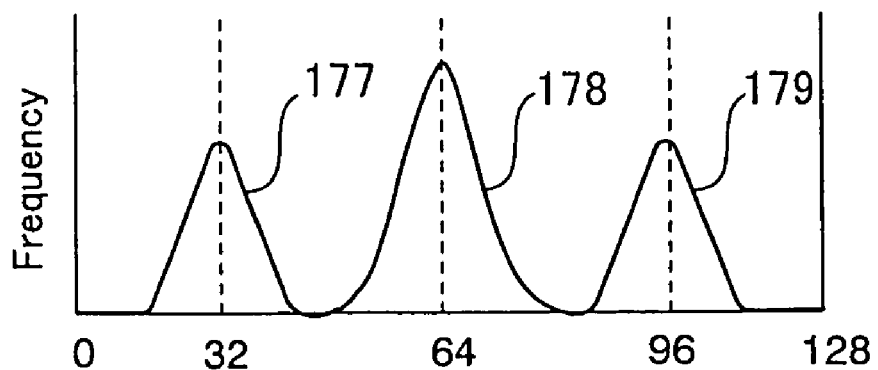
FIG. 27 is an illustration which shows an ideal state free from DC offset.
Figure 28:
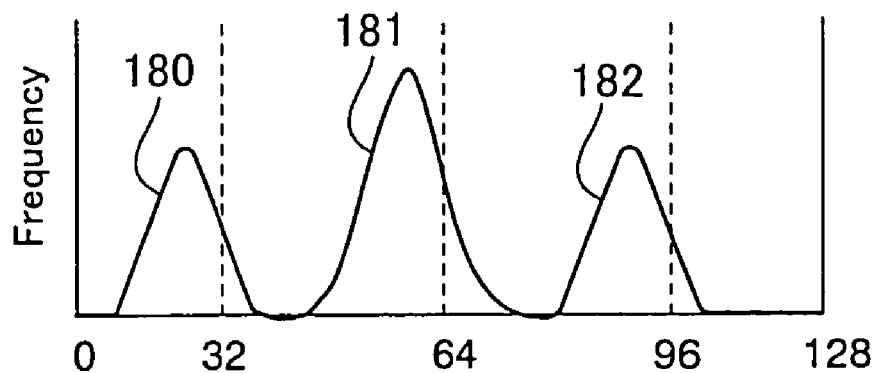
FIG. 28 is an illustration which shows a state in which DC offset occurs.

FIGS. 27 and 28 are illustrations to describe a DC offset, in which FIG. 27 shows an ideal state free from a DC offset and FIG. 28 shows a state in which a DC offset occurs.

The axis of abscissa of each of these drawings shows signal intensity of a reproduction signal and the axis of ordinate shows an occurrence frequency of the signal intensity.

A reproduction signal is a ternary signal and peaks 177, 178, and 179 of frequencies centering around each value are generated in the graph of FIG. 27. The A/D converter 106 has a range of 0 to 128 and it is an ideal state that three values of the reproduction signal are converted into "32", "64", and "96". Three peaks 180, 181, and 182 also appear in FIG. 28 like the ideal state shown in FIG. 27. However, positions of these peaks are shifted from ideal positions. These shifts are DC offsets. These DC offsets influence demodulation in the demodulator 108 shown in FIG. 7 and a trouble of signal processing such a case that proper demodulation becomes difficult occurs.

In the case of the DC offset detector 174 shown in FIG. 26, the value of the DC offset is calculated in accordance with sampling data which reproduces a header pattern and phase-difference information obtained by the phase-difference detector 153, converted into a voltage value by the voltage converter 175, and fed back to a reproduction signal (MO signal) by the offset adjusting amplifier 176, and the offset is adjusted.

Figure 29:
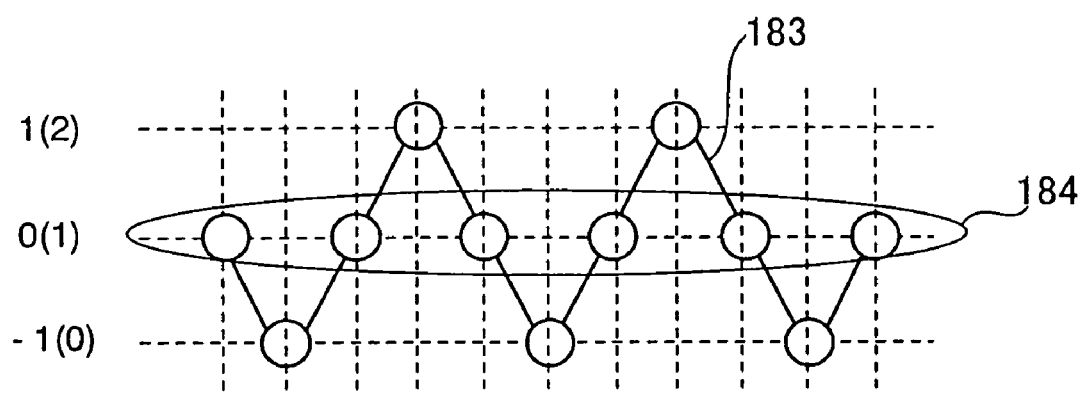
FIG. 29 is an illustration which shows the principle of offset value detection in a DC offset detector.

FIG. 29 is an illustration which shows the principle of offset value detection in the DC offset detector 174.

Sampling data 183 is shown in FIG. 29. In the DC offset detector 174, only a section 184 corresponding to the intermediate value "0" among three values of "1", "0", and "−1" is extracted in accordance with phase-difference information and the sum total of signal levels is calculated. This corresponds to obtaining of the central position of the central peak 181 shown in FIG. 28 and an offset value is obtained by comparing the central position with a reference level ("64" in this case) which shows an ideal central position.

Figure 30:
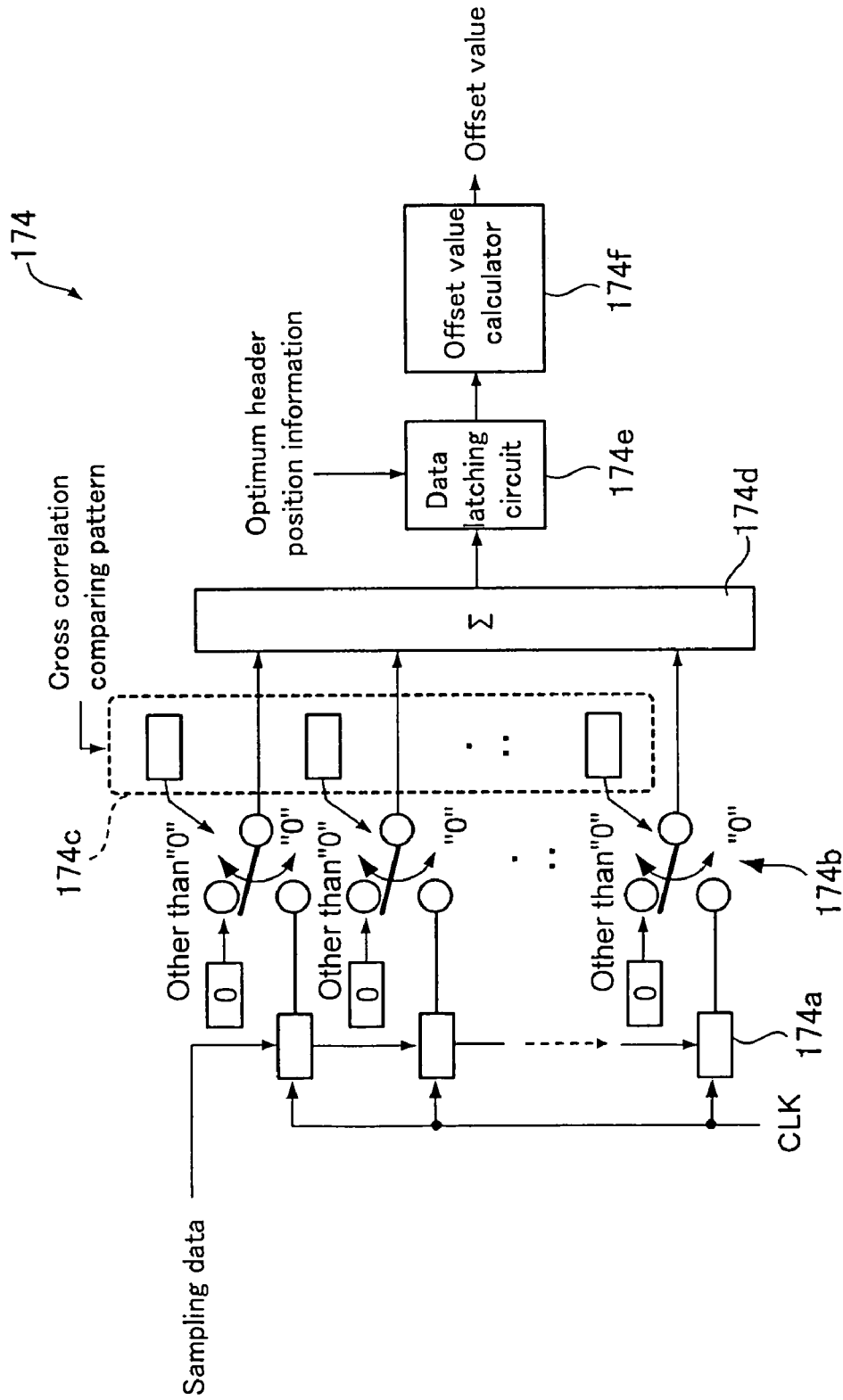
FIG. 30 is a block diagram of a DC offset detector.

FIG. 30 is a block diagram of the DC offset detector 174.

The DC offset detector 174 is constituted of a shift register 174a which stores sampling data and shifts the data one clock by one clock, a switch group 174b which extracts a portion corresponding to the intermediate value "0" of the sampling data, a register group 174c in which a header pattern is stored, a summing amplifier 174d which calculates the sum total of the data selected by switches of the switch group 174b, a data latching circuit 174e which latches the data output from the summing amplifier 174d with optimum header position information according to phase-difference information, and an offset value calculator 174f which calculates an offset value from the latched data.

Only sampling value corresponding to the value "0" of a header pattern stored in each register of the register group 174c is extracted from sampling values stored in each section of the shift register 174a and sent to the summing amplifier 174d, and the sum total is calculated by the summing amplifier 174d.

Figure 31:
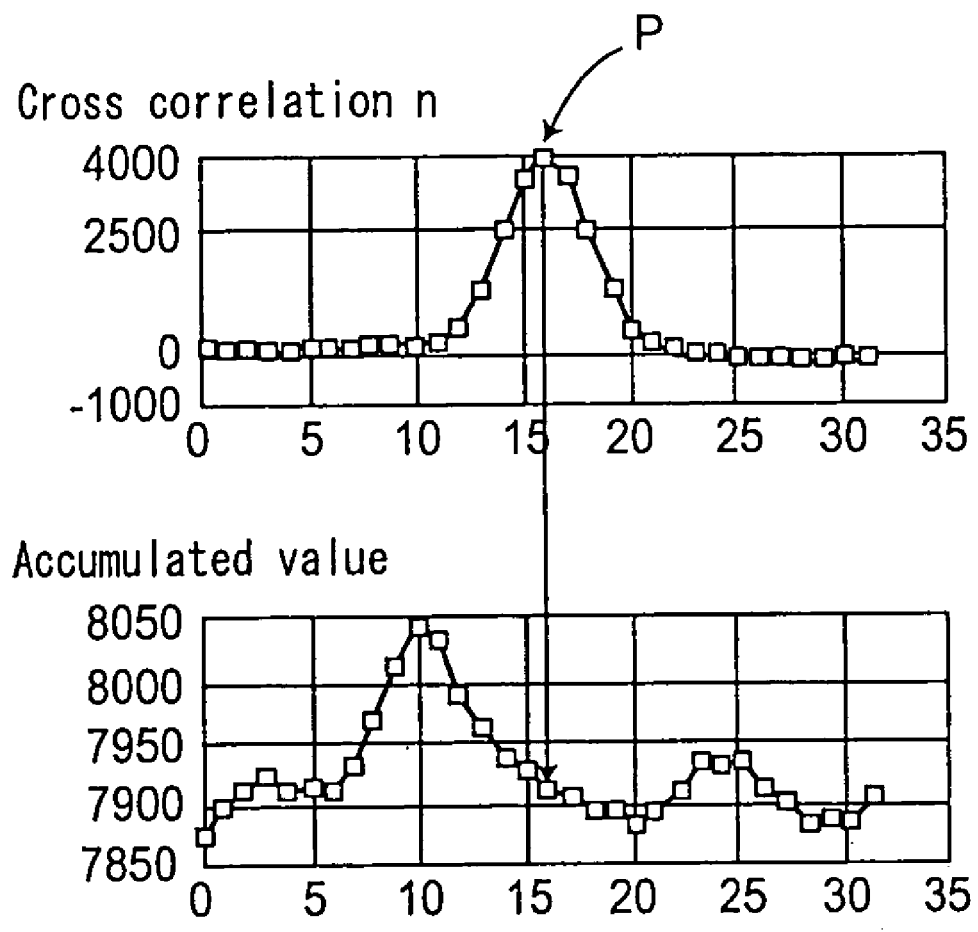
FIG. 31 is an illustration which shows the sum total calculated by a summing amplifier.

FIG. 31 is an illustration which shows the sum total calculated by the summing amplifier 174d.

The axis of abscissa in FIG. 31 shows sampling timings and a graph of the sum total is shown at the lower stage of FIG. 31. Moreover, a cross correlation value obtained by the synchronous detector shown in FIGS. 12 and 13 is shown at the upper stage. The data latching circuit 174e shown in FIG. 30 latches the sum total of the graph at the lower stage at a peak position P of the graph at the upper stage.

The offset value calculator 174f calculates a DC offset value by dividing the latched sum total by the number of data values selected by the switch group 174b and comparing a division result with a reference level set by firm.

In the case of the second embodiment, the DC offset value thus calculated is fed back and corrected as shown in FIG. 26. Therefore, there is no DC offset in the data to be sent to a demodulator and accurate demodulation is performed.

A conformation can be present in which another DC offset detector is used instead of the DC offset detector described above.

Figure 32:
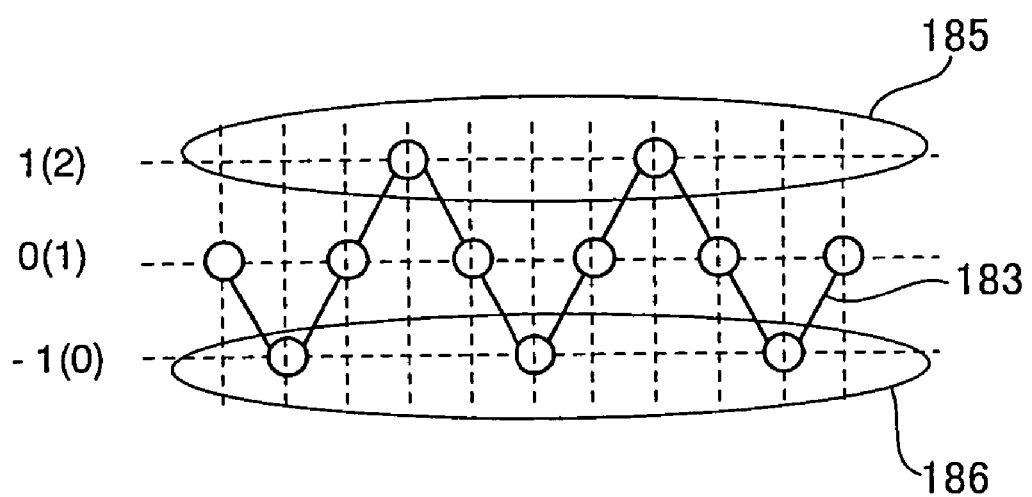
FIG. 32 is an illustration which shows the principle of offset value detection in another DC offset detector.

FIG. 32 is an illustration which shows the principle of offset value detection in another DC offset detector.

FIG. 32 also shows the sampling data 183 similarly to the case of FIG. 29.

The DC offset detector 174 of the above second embodiment extracts a portion corresponding to the intermediate value "0" among three values of "1", "0", and "−1" from the sampling data 183 and detects an offset value. However, another DC offset detector described below detects an offset value by extracting a portion 185 corresponding to the maximum value "1" and a portion 186 corresponding to the minimum value "−1" among three values "1", "0", and "−1" and calculating their intermediate value. This means that central positions of right and left peaks 180 and 182 shown in FIG. 28 are obtained and an offset value is obtained by comparing the intermediate value of these positions with a reference level ("64" in this case) which shows an ideal intermediate value.

Figure 33:
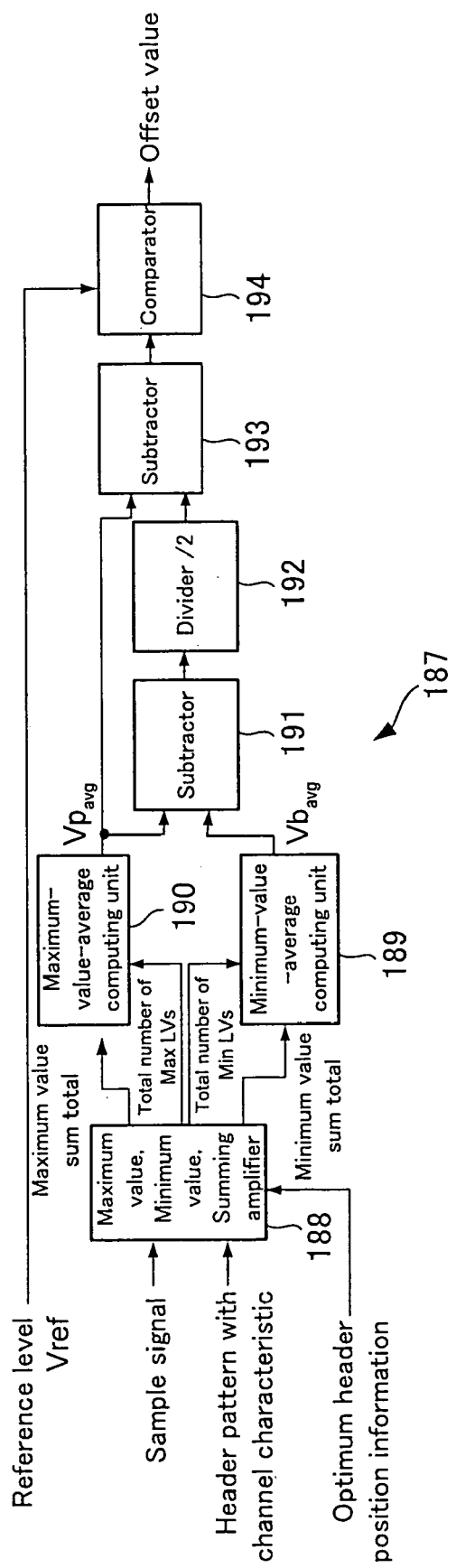
FIG. 33 is a block diagram of still another DC offset detector.

FIG. 33 is a block diagram of another DC offset detector.

The DC offset detector 187 is constituted of a maximum-value-and-minimum-value summing amplifier 188 which calculates the sum total of the portion 185 corresponding to the maximum value "1" shown in FIG. 32 and the sum total of the portion 186 corresponding to the minimum value "−1", minimum-value average computing unit 189 which obtains the average value of the "minimum values" by dividing the sum total of the "minimum values" calculated by the maximum-value-and-minimum-value summing amplifier 188 by the total number of "minimum values", maximum-value average computing unit 190 which similarly obtains the average value of "maximum values", subtracter 191 which subtracts the average of minimum values from the average of maximum values, divider 192 which divides a result by the subtracter 191 by a value "2", subtracter 193 which subtracts a result by the divider 192 from the average of maximum values and obtains the intermediate value between the average value of "minimum values" and the average value of "maximum values", and comparator 194 which compares the intermediate value with a reference level supplied from firm and obtains an offset value.

Though detailed description of the maximum-value-and-minimum-value summing amplifier 188 is omitted, the amplifier 188 is constituted of a circuit group similarly to a circuit group constituted of the shift register 174a, switch group 174b, register group 174c, summing amplifier 174d, and data latching circuit 174e, in which a selection object by the switch group 174b is different.

Also by using the DC offset detector 187, it is possible to obtain a DC offset value.

However, in the case of the conformation shown in FIG. 26, the DC offset value detected by the DC offset detector 174 is fed back to an analog signal before the A/D converter 106. When including this feedback configuration, the time required for signal processing increases. Therefore, it is preferable to correct a DC offset through feed forward according to digital processing. Third embodiment which corrects a DC offset through the feed forward according to digital processing as described above is described below.

Figure 34:
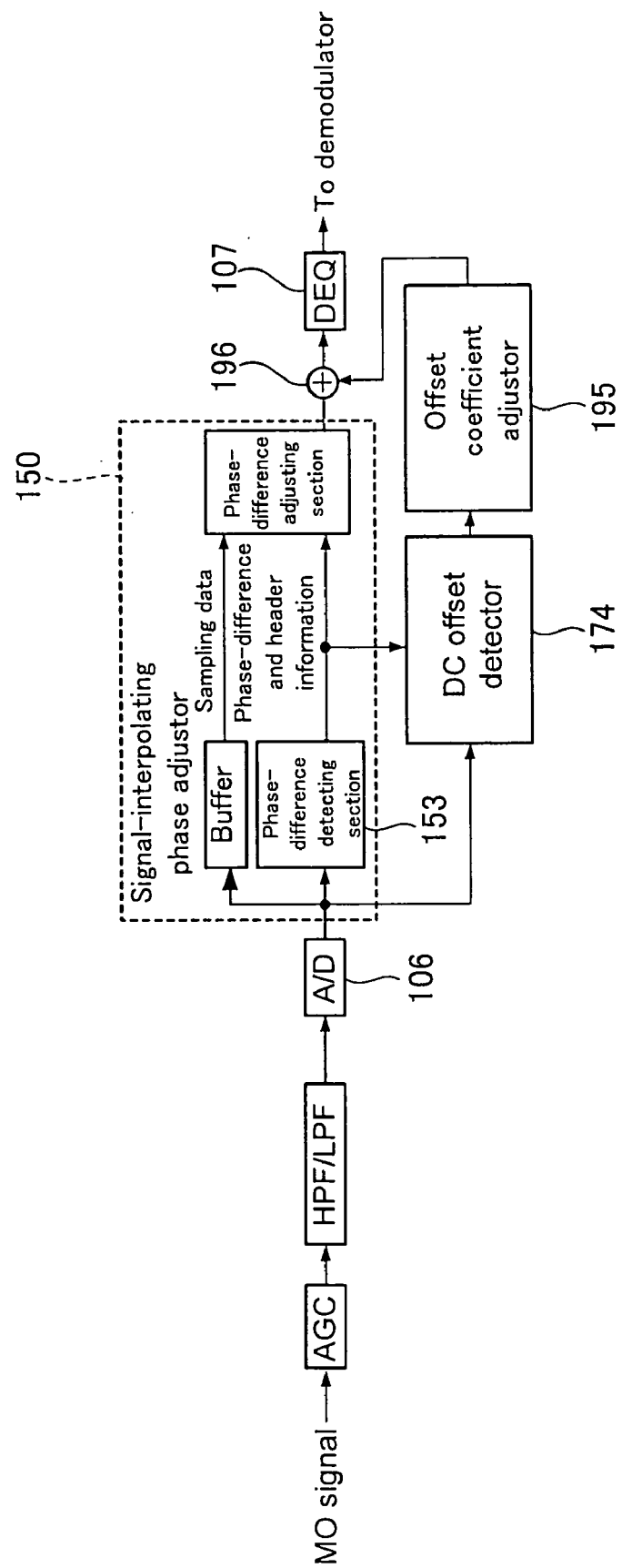
FIG. 34 is an illustration which shows a configuration section which takes charge of correction of a DC offset in third embodiment.

FIG. 34 is an illustration which shows a configuration section to take charge of correction of a DC offset in the third embodiment.

A component provided with having the same symbol as other drawing in the component section is the same as the component section described by referring to other drawing.

The third embodiment is provided with an offset coefficient adjustor 195 and adder 196 in addition to the above DC offset detector 174 in order to correct an offset of signal intensity. In the case of the third embodiment, a DC offset value obtained by the DC offset detector 174 is converted into a coefficient value in digital data by the offset coefficient adjustor 195 and the coefficient value by an adder 196 is added to digital data whose phase is already corrected by the interpolating phase-difference correcting system 150. Thereby, a DC offset is corrected through the feed forward according to digital processing and processing speed is improved.

Then, fourth embodiment in which a function to correct a gain defect of a reproduction signal is built in is described.

Figure 35:
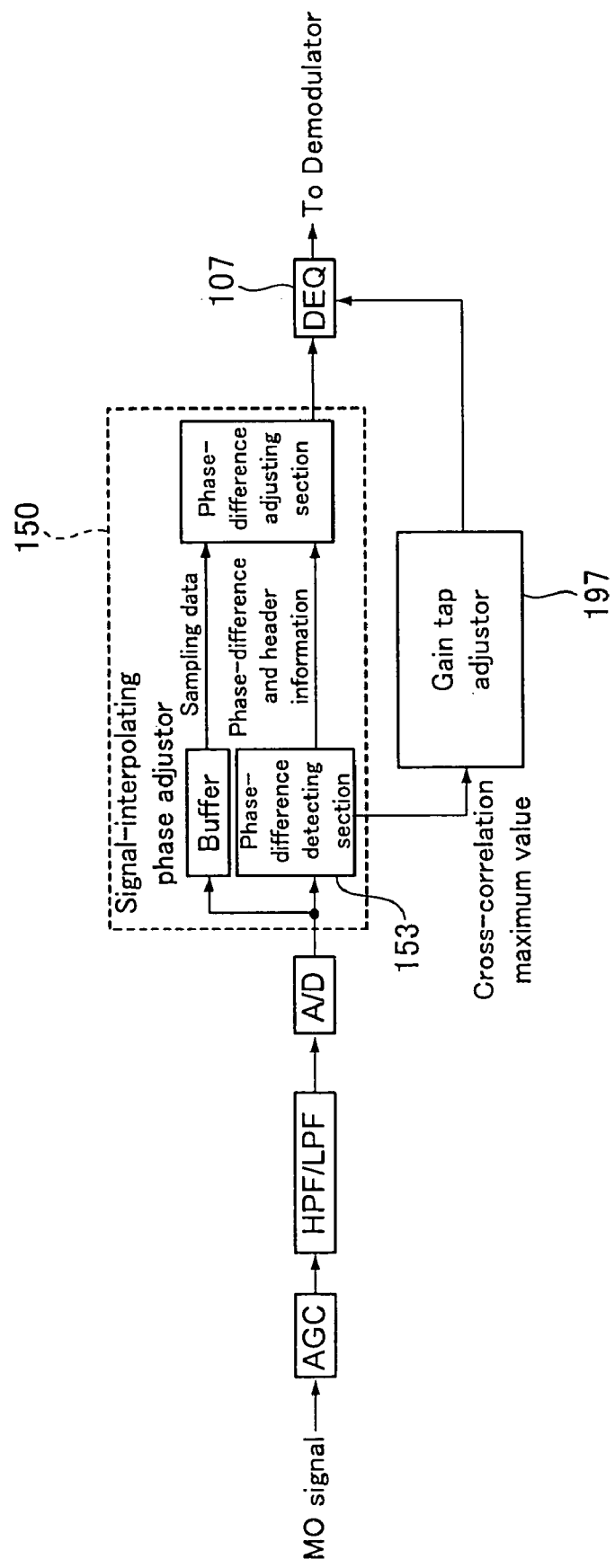
FIG. 35 is an illustration which shows a configuration section which takes charge of correction of a gain defect in fourth embodiment.

FIG. 35 is an illustration which shows a configuration section to take charge of correction of a gain defect in the fourth embodiment.

The fourth embodiment is provided with a gain tap adjustor 197 to correct again defect. The gain tap adjustor 197 detects a gain of a reproduction signal by comparing the maximum value of cross correlation values obtained by phase-difference detecting section 153 of the interpolating phase-difference correcting system 150 with a target cross correlation value set by firm. Moreover, to correct the gain so that the maximum value of cross correlation values coincides with the target cross correlation value, the adjustor 197 adjusts the tap coefficient of the digital waveform equalizer 107.

Figure 36:
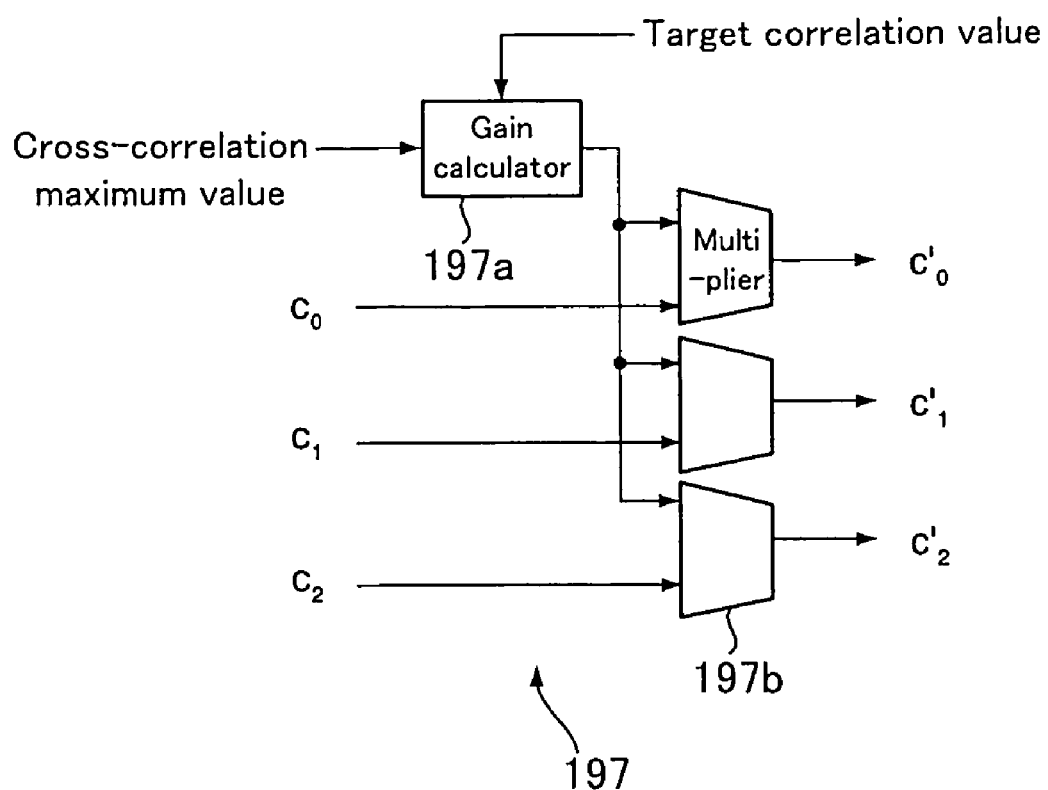
FIG. 36 is a block diagram of a gain tap regulator.

FIG. 36 is a block diagram of the gain tap adjustor 197.

The gain tap adjustor 197 is constituted of a gain calculator 197a and a predetermined number of multipliers 197b. The gain calculator 197a compares the maximum value of cross correlation values with a target correlation value and calculates a gain correction value to make the maximum value of cross correlation values coincide with the target correlation value. Moreover, the gain correction value is multiplied to default tap coefficients $c_0$, $c_1$, and $c_2$ of the digital waveform equalizer 107 and new tap coefficients $c_0'$, $c_1'$, and $c_2'$ are obtained. When these new tap coefficients $c_0'$, $c_1'$, and $c_2'$ are used by the digital waveform equalizer 107, the gain of a reproduction signal is corrected and accurate demodulation by a demodulator is assured.

Finally, a modification of the fourth embodiment is described. In the case of the conformation shown in FIG. 35, the tap coefficient of the digital waveform equalizer 107 is adjusted. Because the structure of the digital waveform equalizer 107 is the same as that of the FIR filter 161 shown in FIG. 16, it is also possible to adjust gain by the FIR filter 161.

Figure 37:
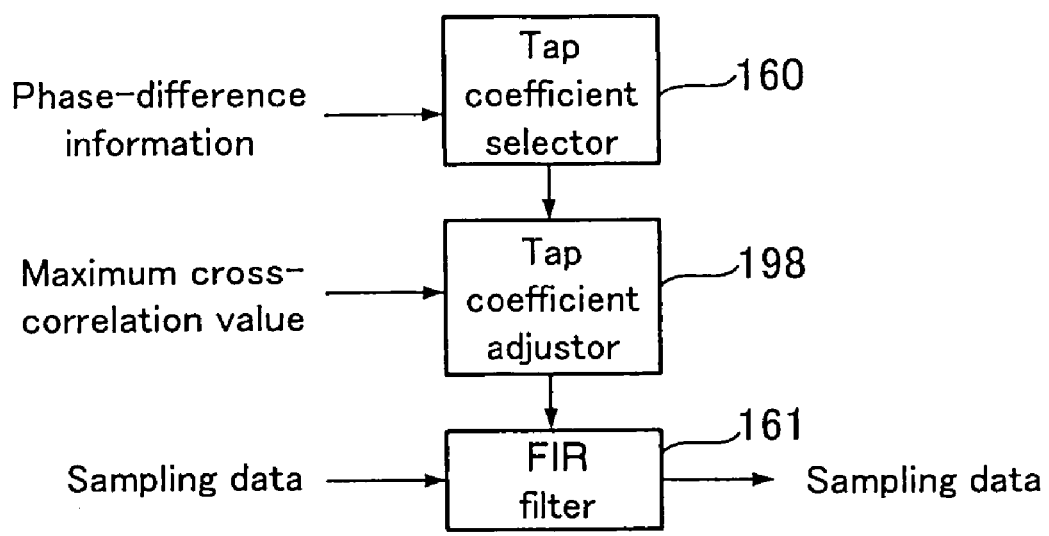
FIG. 37 is an illustration which shows a modification of the fourth embodiment.

FIG. 37 is an illustration which shows a modification of the fourth embodiment.

In the case of this modification, a tap coefficient adjustor 198 same as the gain tap adjustor 197 shown in FIG. 36 is set between the tap coefficient selector 160 and the FIR filter 161 shown in FIG. 15 and the tap coefficient adjustor 198 corrects the tap coefficient of the FIR filter 161 selected by the tap coefficient selector 160 so that the maximum value of cross correlation values coincides with a target correlation value and sends the corrected tap coefficient to the FIR filter 161. Also in the case of this configuration, it is possible to correct the gain of a reproduction signal to an ideal gain and improve a signal quality.

The invention claimed is:

1. A data reproducer which reproduces data from a recording medium which has a plurality of parallel linear tracks and in which data is recorded along the tracks, wherein:
   the recording medium has a first area along the tracks in which user data is recorded and a second area which precedes the first area along the tracks and in which pattern data used for correction of reproducing timing of the user data is recorded, and the pattern data adjacent to each other being mutually different between tracks adjacent to each other, and
   the data reproducer comprises:
   a head which faces the recording medium, and medium, reproduces the data recorded in the recording medium;
   a header pattern generator for generating a pattern data for each of the tracks;
   a first pattern comparing section which compares a pattern data for a track reproduced by the head with the pattern data for a track generated by the header pattern generator;
   a timing correcting section which corrects reproducing timing in accordance with a comparison result by the first pattern comparing section;
   a second pattern comparing section which compares the pattern data for the track reproduced by the head with other pattern data for an other track adjacent to the track generated by the header pattern generator; and
   a crosstalk detecting section which detects crosstalk in accordance with comparison results by the first pattern comparing section and the second pattern comparing section.

2. The data reproducer according to claim 1, wherein the pattern data is pattern data whose auto correlation value shows a peak only at a coincidence point and in which a cross correlation value with other pattern is smaller than the auto correlation value.

3. The data reproducer according to claim 1, wherein the pattern data is a maximum length shift-register-sequence (M sequence).

4. The data reproducer according to claim 1, further comprising:
   a tracking adjusting section which adjusts the reproducing position of the head to the track to be reproduced in accordance with the crosstalk detected by the crosstalk detecting section.

5. The data reproducer according to claim 4, wherein the recording medium has a test area used for a test of recording/reproducing of data, and
   the tracking adjusting section performs the adjustment in accordance with the crosstalk detected at the time of a test in the test area.

6. The data reproducer according to claim 4, wherein the tracking adjusting section performs the adjustment when failing in recording/reproducing of data and retrying recording/reproducing.

7. The data reproducer according to claim 4, wherein the tracking adjusting section sequentially performs the adjustment in accordance with the crosstalk detected when data is reproduced.

8. The data reproducer according to claim 1, further comprising an angle adjusting section which adjusts an angle for the head to face the recording medium in accordance with the crosstalk detected by the crosstalk detecting section.

9. The data reproducer according to claim 8, wherein the recording medium has a test area used for a test of recording/reproducing of data, and
   the angle adjusting section performs the adjustment in accordance with the crosstalk detected at the time of a test in the test area.

10. The data reproducer according to claim 8, wherein the angle adjusting section performs the adjustment when failing in recording/reproducing of data and retrying recording/reproducing.

11. The data reproducer according to claim 8, wherein the angle adjusting section sequentially performs the adjustment in accordance with the crosstalk detected when data is reproduced.

12. The data reproducer according to claim 1, further comprising a reproducing-power adjusting section which adjusts reproducing-power in the head in accordance with the crosstalk detected by the crosstalk detecting section.

13. The data reproducer according to claim 12, wherein the recording medium has a test area used for a test of recording/reproducing of data, and
   the reproducing-power adjusting section performs the adjustment in accordance with the crosstalk detected at the time of a test in the test area.

14. The data reproducer according to claim 12, wherein the reproducing-power adjusting section performs the adjustment when failing in recording/reproducing of data and retrying recording/reproducing.

15. The data reproducer according to claim 12, wherein the reproducing-power adjusting section sequentially performs the adjustment in accordance with the crosstalk detected when data is reproduced.

16. The data reproducer according to claim 1, further comprising a distance adjusting section which adjusts a distance for the head to face the recording medium.

17. The data reproducer according to claim 16, wherein the recording medium has a test area used for a test of recording/reproducing of data, and
   the distance adjusting section performs the adjustment in accordance with the crosstalk detected at the time of a test in the test area.

18. The data reproducer according to claim 16, wherein the distance adjusting section performs the adjustment when failing in recording/reproducing of data and retrying recording/reproducing.

19. The data reproducer according to claim 16, wherein the distance adjusting section sequentially performs the adjustment in accordance with the crosstalk detected when data is reproduced.

20. The data reproducer according to claim 1, wherein the head records data in the recording medium, and the data reproducer further comprises a recording-power adjusting section is provided which adjusts recording power in the head in accordance with the crosstalk detected by the crosstalk detecting section.

21. The data reproducer according to claim 20, wherein the recording medium has a test area used for a test of recording/reproducing of data, and the recording-power adjusting section performs the adjustment in accordance with the crosstalk detected at the time of a test in the test area.

22. The data reproducer according to claim 1, wherein the first pattern comparing section and the second pattern comparing section respectively obtain a cross correlation value as a result of comparing pattern data with a reproduction signal.

23. The data reproducer according to claim 1, wherein the first pattern comparing section and the second pattern comparing section respectively convert pattern data so that the sum total of data levels becomes 0 when comparing the pattern data with a reproduction signal and compare the converted pattern data with the reproduction signal to obtain a cross correlation value.

24. The data reproducer according to claim 23, wherein the crosstalk detecting section detects crosstalk in accordance with a relative ratio between maximum values of cross correlation values obtained by the first pattern comparing section and the second pattern comparing section.

25. The data reproducer according to claim 23, wherein the crosstalk detecting section determines that crosstalk is present when a cross correlation value obtained by the second pattern comparing section exceeds a predetermined threshold value.

26. The data reproducer according to claim 25, wherein the predetermined threshold value is set to the crosstalk detecting section and the section determines presence or absence of crosstalk by using the set threshold value.

* * * * *

UNITED STATES PATENT AND TRADEMARK OFFICE
CERTIFICATE OF CORRECTION

| | | |
|---|---|---|
| PATENT NO. | : 7,554,897 B2 | Page 1 of 1 |
| APPLICATION NO. | : 11/280558 | |
| DATED | : June 30, 2009 | |
| INVENTOR(S) | : Kanaoka | |

It is certified that error appears in the above-identified patent and that said Letters Patent is hereby corrected as shown below:

In the Claims:

Col. 19, line 35, delete "medium" (second occurrence).

Signed and Sealed this
Seventh Day of April, 2015

Michelle K. Lee
*Director of the United States Patent and Trademark Office*